United States Patent
Mallik et al.

(10) Patent No.: US 10,681,733 B2
(45) Date of Patent: Jun. 9, 2020

(54) LICENSE ASSISTED REQUEST-TO-SEND AND CLEAR-TO-SEND TRANSMISSION

(71) Applicant: QUALCOMM Incorporated, San Diego, CA (US)

(72) Inventors: Siddhartha Mallik, San Diego, CA (US); Taesang Yoo, San Diego, CA (US); Jing Sun, San Diego, CA (US); Anastasios Stamoulis, San Diego, CA (US); Aleksandar Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 15/649,074

(22) Filed: Jul. 13, 2017

(65) Prior Publication Data

US 2018/0035463 A1    Feb. 1, 2018

Related U.S. Application Data

(60) Provisional application No. 62/366,828, filed on Jul. 26, 2016.

(51) Int. Cl.
*H04W 4/00* (2018.01)
*H04W 74/08* (2009.01)
(Continued)

(52) U.S. Cl.
CPC ....... *H04W 74/0816* (2013.01); *H04W 16/14* (2013.01); *H04W 72/0453* (2013.01); *H04W 88/06* (2013.01)

(58) Field of Classification Search
CPC ............. H04W 74/0816; H04W 16/14; H04W 72/0453; H04W 88/06
See application file for complete search history.

(56) References Cited

U.S. PATENT DOCUMENTS

| 9,332,536 | B1* | 5/2016 | Zappaterra | ........ H04W 72/0406 |
| 2002/0136183 | A1* | 9/2002 | Chen | ................. H04W 72/1215 370/338 |

(Continued)

FOREIGN PATENT DOCUMENTS

WO    WO-2016046626 A1    3/2016

OTHER PUBLICATIONS

ISA/EP, International Search Report and Written Opinion of the International Searching Authority, Int'l Application No. PCT/US2017/042183, dated Oct. 5, 2017, European Patent Office, Rijswijk, NL, 13 pgs.

*Primary Examiner* — Stephen M D Agosta
(74) *Attorney, Agent, or Firm* — Holland & Hart LLP

(57) ABSTRACT

Methods, systems, and devices for wireless communication are described. A user equipment (UE) or base station communicating in an unlicensed radio frequency spectrum band may transmit a signal (e.g., a request-to-send (RTS) or clear-to-send (CTS) signal) in a licensed radio frequency spectrum band to decrease the likelihood that neighboring devices will transmit interfering communications. Specific resources may be designated in the licensed radio frequency spectrum band for transmitting these signals, and these resources may be associated with specific unlicensed channels. Signaling in the licensed radio frequency spectrum band may also carry an indication of the unlicensed channel being used or other information relevant to the unlicensed communication. The RTS/CTS signaling in licensed radio frequency spectrum band may be transmitted during a downlink transmit opportunity or an uplink transmit opportunity, or both. Different energy detection thresholds may apply to RTS/CTS signals in licensed and unlicensed spectrum.

28 Claims, 17 Drawing Sheets

(51) Int. Cl.
*H04W 16/14* (2009.01)
*H04W 72/04* (2009.01)
*H04W 88/06* (2009.01)

(56) References Cited

U.S. PATENT DOCUMENTS

| | | | | |
|---|---|---|---|---|
| 2007/0042797 A1* | 2/2007 | Lee | ............... | H04W 74/002 |
| | | | | 455/509 |
| 2009/0154426 A1* | 6/2009 | Perraud | ............ | H04W 36/26 |
| | | | | 370/332 |
| 2010/0172299 A1* | 7/2010 | Fischer | ........... | H04W 74/002 |
| | | | | 370/328 |
| 2010/0184435 A1* | 7/2010 | Shellhammer | ...... | H04W 36/385 |
| | | | | 455/436 |
| 2011/0134901 A1* | 6/2011 | Hoshino | ........... | H04B 7/0426 |
| | | | | 370/344 |
| 2011/0235576 A1 | 9/2011 | Gong et al. | | |
| 2013/0156019 A1* | 6/2013 | Chen | ............... | H04W 72/1215 |
| | | | | 370/338 |
| 2014/0287769 A1* | 9/2014 | Taori | ............... | H04W 74/0808 |
| | | | | 455/450 |
| 2014/0341018 A1 | 11/2014 | Bhushan et al. | | |
| 2014/0376483 A1* | 12/2014 | Hong | ............... | H04W 72/048 |
| | | | | 370/329 |
| 2015/0071239 A1* | 3/2015 | Zhang | ............... | H04L 1/0006 |
| | | | | 370/329 |
| 2015/0181638 A1* | 6/2015 | Tabet | ............... | H04W 28/085 |
| | | | | 370/228 |
| 2016/0227678 A1* | 8/2016 | Park | ............... | H05K 7/20963 |

* cited by examiner

LICENSE ASSISTED REQUEST-TO-SEND AND CLEAR-TO-SEND TRANSMISSION

CROSS REFERENCES

The present Application for Patent claims priority to U.S. Provisional Patent Application No. 62/366,828 by Mallik et al., entitled "Licensed Assisted Request-To-Send and Clear-To-Send Transmission," filed Jul. 26, 2016, assigned to the assignee hereof, and is hereby expressly incorporated by reference herein in its entirety.

BACKGROUND

The following relates generally to wireless communication and more specifically to license assisted request-to-send (RTS) and clear-to-send (CTS) transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some wireless communications systems may operate using a one radio access technology (RAT) (e.g., to the LTE standard) and may include a number of base stations, each simultaneously supporting communications with multiple UEs. Another wireless communications multiple-access system may operate according to a different RAT (e.g., a system operating according to an IEEE 802.11 standard) that may include a number of base stations supporting communication with multiple stations in a shared frequency spectrum. The two systems may communicate in a shared or unlicensed RF spectrum band on the same or overlapping time or frequency resources.

Devices communicating in a shared or unlicensed radio frequency spectrum band may exchange signaling messages prior to transmitting or receiving data to indicate to other nearby devices that the shared or unlicensed medium is occupied. If, however, a nearby device does not detect the signal exchange, that nearby device may transmit messages that cause interference with other nearby transmissions.

SUMMARY

A user equipment (UE) or base station communicating in an unlicensed radio frequency (RF) spectrum band may transmit a signal (i.e., a request-to-send (RTS) or clear-to-send (CTS) signal) in licensed RF spectrum band in an effort to ensure that neighboring devices do not interfere with the communication. In some cases, specific resources may be designated in the licensed RF spectrum band for transmitting these signals, and these resources may be associated with specific unlicensed channels. In some cases, the signaling in licensed RF spectrum band may further carry an indication of the unlicensed channel being used, or other information relevant to the unlicensed communication. The RTS/CTS signaling in the licensed RF spectrum band may be transmitted, in some cases, continuously, during a downlink transmit opportunity or an uplink transmit opportunity, or both. In some cases, different energy detection thresholds may apply to RTS/CTS signals in licensed and unlicensed spectrum.

A method of wireless communication is described. The method may include a configuration of carriers, where the configuration of carriers may include an unlicensed carrier in an unlicensed radio frequency spectrum band and a licensed carrier in a licensed radio frequency spectrum band. The method may include receiving a communication on the unlicensed carrier during a downlink portion of a transmission opportunity (TxOP), and transmitting one or more CTS signals on the licensed carrier during a time that at least partially overlaps the downlink portion of the TxOP, where the CTS signals may be transmitted based at least in part on receiving the communication.

An apparatus for wireless communication is described. The apparatus may include may include a configuration of carriers, where the configuration of carriers may include an unlicensed carrier in an unlicensed radio frequency spectrum band and a licensed carrier in a licensed radio frequency spectrum band. The apparatus may include means for receiving a communication on the unlicensed carrier during a downlink portion of a TxOP, and means for transmitting one or more CTS signals on the licensed carrier during a time that at least partially overlaps the downlink portion of the TxOP, where the CTS signals may be transmitted based at least in part on receiving the communication.

Another apparatus for wireless communication is described. The apparatus may include a configuration of carriers, where the configuration of carriers may include an unlicensed carrier in an unlicensed radio frequency spectrum band and a licensed carrier in a licensed radio frequency spectrum band. The apparatus may include a processor, memory in electronic communication with the processor, and instructions stored in the memory. The instructions may be executable by the processor to cause the apparatus to receive a communication on the unlicensed carrier during a downlink portion of a TxOP, and transmit one or more CTS signals on the licensed carrier during a time that at least partially overlaps the downlink portion of the TxOP, where the CTS signals are transmitted based at least in part on receiving the communication.

A non-transitory computer readable medium for wireless communication is described. The non-transitory computer-readable medium may include a configuration of carriers, where the configuration of carriers may include an unlicensed carrier in an unlicensed radio frequency spectrum band and a licensed carrier in a licensed radio frequency spectrum band. The non-transitory computer-readable medium may include instructions operable to cause a processor to receive a communication on the unlicensed carrier during a downlink portion of a TxOP, and transmit one or more CTS signals on the licensed carrier during a time that at least partially overlaps the downlink portion of the TxOP, where the CTS signals are transmitted based at least in part on receiving the communication.

Some examples of the method, apparatus, and non-transitory computer-readable medium described above may further include processes, features, means, or instructions for receiving an RTS signal on the carrier in the unlicensed radio frequency spectrum band. Some examples of the method, apparatus, and non-transitory computer-readable medium described above may further include processes, features, means, or instructions for transmitting an initial CTS signal on an unlicensed carrier in response to the RTS signal, wherein the received communication may be responsive to the initial CTS signal.

Some examples of the method, apparatus, and non-transitory computer-readable medium described above may further include processes, features, means, or instructions for monitoring the carrier in the unlicensed radio frequency spectrum band and the carrier in the licensed radio frequency spectrum band for an additional CTS signal from a neighboring device.

In some examples of the method, apparatus, and non-transitory computer-readable medium described above, the carrier in the licensed radio frequency spectrum band may be monitored using a first energy detection threshold and the carrier in the unlicensed radio frequency spectrum band may be monitored using a second energy detection threshold different from the first energy detection threshold.

In some examples of the method, apparatus, and non-transitory computer-readable medium described above, a duration of the time that at least partially overlaps the downlink portion of the TxOP comprises a duration of the downlink portion of the TxOP. In some examples of the method, apparatus, and non-transitory computer-readable medium described above, the duration of the time that at least partially overlaps the downlink portion of the TxOP comprises a duration of an uplink portion of the TxOP.

In some examples of the method, apparatus, and non-transitory computer-readable medium described above, the carrier in the licensed radio frequency spectrum band may be a frequency division duplexing (FDD) configured carrier. In some examples of the method, apparatus, and non-transitory computer-readable medium described above, the one or more CTS signals may be transmitted with a frequency hopping pattern using a plurality of frequency bands within the carrier in the licensed radio frequency spectrum band.

In some examples of the method, apparatus, and non-transitory computer-readable medium described above, a transmission power of the one or more CTS signals may be based at least in part on a first path loss parameter that may be different from a second path loss parameter of the transmission received using the carrier in the unlicensed radio frequency spectrum band. In some examples of the method, apparatus, and non-transitory computer-readable medium described above, the one or more CTS signals may be transmitted using a frequency region of the carrier in the licensed radio frequency spectrum band designated for signaling associated with a plurality of unlicensed channels.

In some examples of the method, apparatus, and non-transitory computer-readable medium described above, the one or more CTS signals comprise an indication of a channel of the carrier in the unlicensed radio frequency spectrum band, wherein the transmission may be received on the channel.

Another method of wireless communication is described. The method may include a configuration of carriers, where the configuration of carriers may include an unlicensed carrier in an unlicensed radio frequency spectrum band and a licensed carrier in a licensed radio frequency spectrum band. The method may include transmitting a communication on the unlicensed carrier during a downlink portion of a TxOP, and transmitting one or more RTS signals on the licensed carrier during a time that at least partially overlaps the downlink portion of the TxOP, where the one or more RTS signals are transmitted based at least in part on transmitting the communication.

Another apparatus for wireless communication is described. The apparatus may include may include a configuration of carriers, where the configuration of carriers may include an unlicensed carrier in an unlicensed radio frequency spectrum band and a licensed carrier in a licensed radio frequency spectrum band. The apparatus may include means for transmitting a communication on the unlicensed carrier during a downlink portion of a TxOP, and means for transmitting one or more RTS signals on the licensed carrier during a time that at least partially overlaps the downlink portion of the TxOP, where the one or more RTS signals are transmitted based at least in part on transmitting the communication.

Another apparatus for wireless communication is described. The apparatus may include a configuration of carriers, where the configuration of carriers may include an unlicensed carrier in an unlicensed radio frequency spectrum band and a licensed carrier in a licensed radio frequency spectrum band. The apparatus may include a processor, memory in electronic communication with the processor, and instructions stored in the memory. The instructions may be executable by the processor to cause the apparatus to transmit a communication on the unlicensed carrier during a downlink portion of a TxOP, and transmit one or more RTS signals on the licensed carrier during a time that at least partially overlaps the downlink portion of the TxOP, where the one or more RTS signals are transmitted based at least in part on transmitting the communication.

Another non-transitory computer readable medium for wireless communication is described. The non-transitory computer-readable medium may include a configuration of carriers, where the configuration of carriers may include an unlicensed carrier in an unlicensed radio frequency spectrum band and a licensed carrier in a licensed radio frequency spectrum band. The non-transitory computer-readable medium may include instructions operable to cause a processor to transmit a communication on the unlicensed carrier during a downlink portion of a TxOP, and transmit one or more RTS signals on the licensed carrier during a time that at least partially overlaps the downlink portion of the TxOP, where the one or more RTS signals are transmitted based at least in part on transmitting the communication.

In some examples of the method, apparatus, and non-transitory computer-readable medium described above, a duration of the time that at least partially overlaps the downlink portion of the TxOP comprises a duration of the downlink portion of the TxOP. In some examples of the method, apparatus, and non-transitory computer-readable medium described above, the duration of the time that at least partially overlaps the downlink portion of the TxOP comprises a duration of an uplink portion of the TxOP.

In some examples of the method, apparatus, and non-transitory computer-readable medium described above, the one or more RTS signals may be transmitted with a frequency hopping pattern using a plurality of frequency bands of the carrier in the licensed radio frequency spectrum band. In some examples of the method, apparatus, and non-transitory computer-readable medium described above, a transmission power of the one or more RTS signals may be based at least in part on a first path loss parameter that may be different from a second path loss parameter of the communication transmitted on the carrier in the licensed radio frequency spectrum band.

In some examples of the method, apparatus, and non-transitory computer-readable medium described above, the one or more RTS signals may be transmitted using a frequency region of the carrier in the licensed radio frequency spectrum band designated for signaling associated with a plurality of unlicensed channels. In some examples of the method, apparatus, and non-transitory computer-readable medium described above, the one or more RTS signals comprise an indication of a channel of the carrier in the unlicensed radio frequency spectrum band, wherein the communication may be transmitted on the channel.

Some examples of the method, apparatus, and non-transitory computer-readable medium described above may further include processes, features, means, or instructions for transmitting an initial RTS signal using the carrier in the unlicensed radio frequency spectrum band. Some examples of the method, apparatus, and non-transitory computer-readable medium described above may further include processes, features, means, or instructions for receiving a CTS signal in response to the RTS signal, wherein the communication may be responsive to an initial CTS signal.

DETAILED DESCRIPTION

Figure 1:
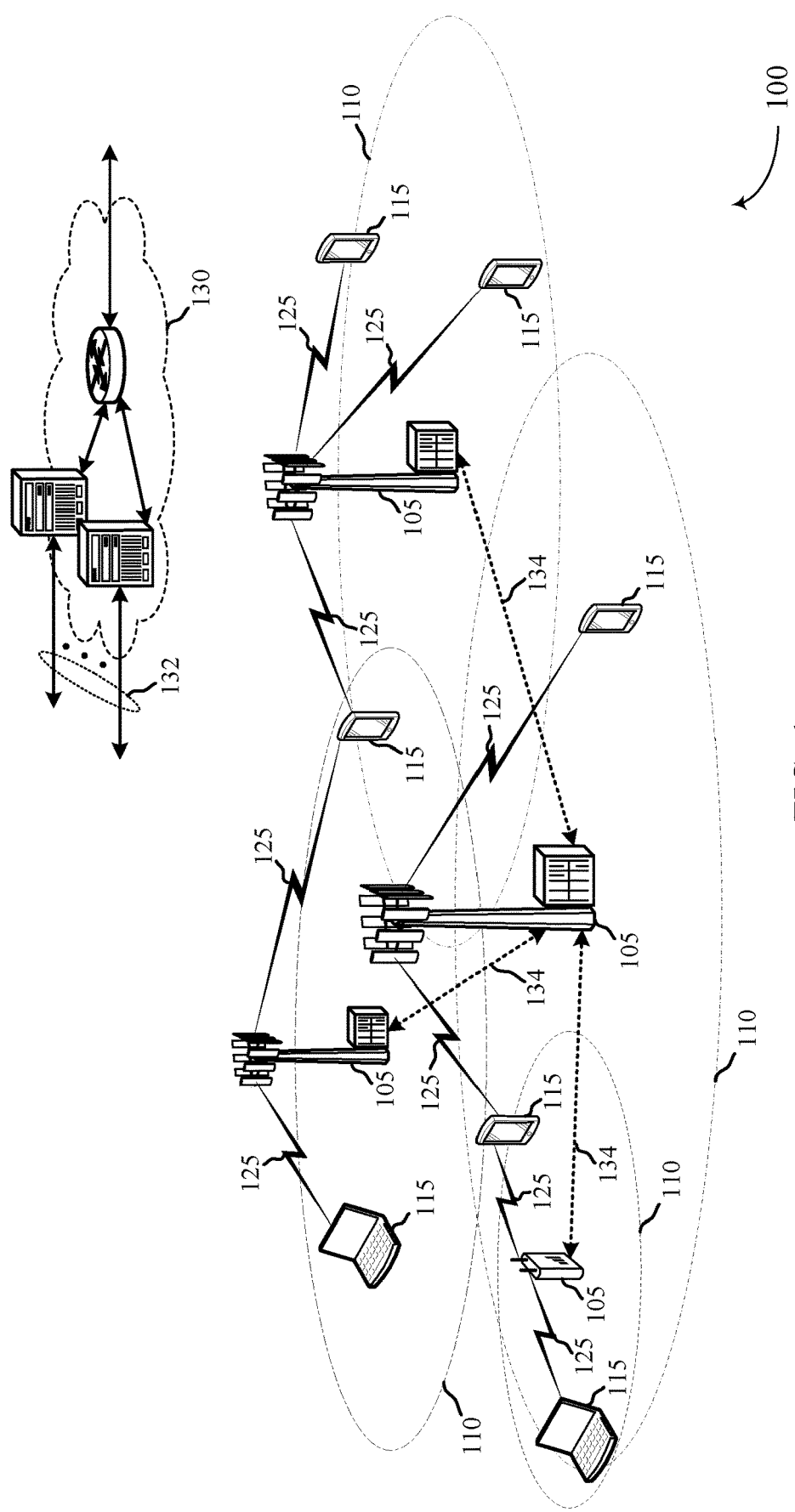
FIG. 1 illustrates an example of a wireless communications system that supports license assisted request-to-send (RTS) and clear-to-send (CTS) transmission in accordance with aspects of the present disclosure.

In some wireless systems, a user equipment (UE) and a serving base station may be configured for communication in both licensed radio frequency (RF) spectrum bands (i.e., licensed spectrum) and shared or unlicensed RF spectrum bands (i.e., unlicensed spectrum). The serving base station may perform a listen-before-talk (LBT) procedure and transmit a request-to-send (RTS) signal in unlicensed spectrum if the transmission medium is available. The UE may transmit a clear-to-send (CTS) signal in response to the RTS. If a non-serving base station (or another device operating in unlicensed spectrum) does not detect the CTS signal, the non-serving base station may interfere with a subsequent transmission from the serving base station. Therefore, while communicating in unlicensed spectrum with the base station, the UE may transmit a CTS signal in licensed spectrum. For example, the UE may transmit the CTS signal in licensed spectrum while receiving downlink data from the serving base station. Specific resources may be set aside in licensed RF spectrum band for CTS transmission. Additionally or alternatively, CTS transmission in licensed spectrum may overlap with uplink transmission.

A UE operating in both licensed and unlicensed spectrum may transmit a CTS signal in licensed spectrum while communicating with a base station in an unlicensed spectrum. For example, a base station may perform an LBT procedure and transmit an initial RTS signal in the unlicensed spectrum if a transmission medium is available—i.e., if the base station is able to determine that the unlicensed spectrum or a portion of the band is not being occupied by other transmissions. The UE may transmit an initial CTS signal in the unlicensed spectrum in response to the RTS signal in the unlicensed spectrum. Then, the UE may transmit the CTS signal in the licensed spectrum while communicating with the base station in the unlicensed spectrum. In some examples, the licensed spectrum may be a frequency division duplexing (FDD)—configured carrier in licensed RF spectrum. The UE may transmit CTS signals in the licensed spectrum during the transmission of downlink frames in unlicensed spectrum. The CTS transmissions may be made on designated resources, and may overlap with uplink transmissions.

Aspects of the disclosure introduced above are described below with reference to a wireless communications system. Examples of RTS and CTS transmissions in licensed and unlicensed spectrums are then described. Aspects of the disclosure are further illustrated by and described with reference to apparatus diagrams, system diagrams, and flowcharts that relate to license assisted RTS and CTS transmission. Throughout this disclosure, a licensed RF spectrum band or bands may be referred to as licensed spectrum, and transmissions in a licensed RF spectrum band may be referred to as licensed transmissions, licensed signals, licensed communication, or the like. Likewise, an unlicensed RF spectrum band or bands may be referred to as unlicensed spectrum, and transmissions in an unlicensed RF spectrum band may be referred to as unlicensed transmissions, unlicensed signals, unlicensed communication, or the like.

FIG. 1 illustrates an example of a wireless communications system 100 that supports license assisted RTS and CTS transmission in accordance with various aspects of the present disclosure. The wireless communications system 100 includes base stations 105, UEs 115, and a core network 130. In some examples, the wireless communications system 100 may be a Long Term Evolution (LTE) (or LTE-Advanced) network. Wireless communications system 100 may support RTS and CTS transmission in licensed spectrum concurrent with communication in unlicensed spectrum.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine-type-communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE-U) radio access technology in an unlicensed band such as the 5 Ghz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a CA configuration in conjunction with component carriers (CCs) operating in a licensed RF spectrum band. Operations in unlicensed spectrum may include downlink transmissions, uplink transmissions, or both. Duplexing in unlicensed spectrum may be based on FDD, time division duplexing (TDD) or a combination of both. For example, a UE may transmit a CTS over a licensed spectrum while receiving unlicensed downlink transmissions.

In some cases, a UE 115 or base station 105 may operate in a shared or unlicensed radio frequency spectrum band. These devices may perform a clear channel assessment (CCA) prior to communicating in order to determine whether the channel is available. A CCA may include an energy detection procedure to determine whether there are any other active transmissions. For example, the device may infer that a change in a reference signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

A wireless device that is not identifiable by a UE 115 but that is detectable to the serving base station 105 (or vice versa) may be known as a hidden node. Hidden nodes may cause interference between a UE 115 and the serving base station 105, especially when communicating on unlicensed spectrum. Thus, contention-based access procedures may be replaced or supplemented by the exchange of an RTS packet transmitted by a transmitting device initiating communication and a CTS packet transmitted by a receiving device. This may alert other devices within range of either the transmitter or the receiver not to transmit for the duration of the subsequent transmission. Thus, RTS/CTS exchange may help mitigate a hidden node problem. In some examples, RTS/CTS may also be transmitted on a licensed spectrum while communicating on unlicensed spectrum.

Transmissions within wireless communications system 100 may be organized into time intervals, which may be expressed in multiples of a basic time unit (e.g., the sampling period, $T_s=1/30,720,000$ seconds). In LTE, for example, time resources may be organized according to radio frames of length of 10 ms ($T_f=307200T_s$), which may be identified by an system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). A resource element may contain of one symbol period and one subcarrier (a 15 KHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements.

Other frame structures may also be employed in wireless communications system 100. Within wireless communications system 100, communications in unlicensed spectrum may be organized by transmission opportunities (TxOPs), which may have some similarity to the frame structure described above and which a may be separated by periods of time during which the wireless medium may be unavailable for devices (e.g., UEs 115 or eNBs 105) within wireless communications system 100. A TxOP may have a downlink portion (e.g., a number of consecutive downlink TTIs) and an uplink portion (e.g., a number of consecutive uplink TTIs).

Base stations 105 and a UEs 115 may communicate using one or more carriers. Carriers may be aggregated, and each aggregated carrier may be referred to as a component carrier (CC). Each carrier or CC can have a bandwidth of, e.g., 1.4, 3, 5, 10, 15 or 20 MHz. In some cases, the number of CCs can be limited to, e.g., a maximum of five 20 MHz carriers, giving maximum aggregated bandwidth is 100 MHz. Carriers may be configured as FDD carriers or TDD carriers, and the number of aggregated carriers can be different in DL and UL. The number of UL component carriers may be equal to or lower than the number of DL component carriers.

A configuration of carriers may include a carrier in an unlicensed radio frequency spectrum band and a carrier in a licensed radio frequency spectrum band. The individual component carriers can also be of different bandwidths. Component carriers may be arranged in a number of ways. For example, a CA configuration may be based on contiguous component carriers within the same operating frequency band, i.e., called intra-band contiguous CA. Non-contiguous allocations can also be used, where the component carriers may be either be intra-band, or inter-band.

Carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported. For example, TDD frames may include one or more special frames, and the period between special frames may determine the TDD DL-to-UL switch-point periodicity for the frame.

Use of TDD may offer flexible deployments without paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115.

In some cases, wireless communications system 100 may utilize one or more enhanced component carriers (eCCs). An enhanced component carrier (eCC) may be characterized by one or more features including: flexible bandwidth, different TTIs, and modified control channel configuration. In some cases, an eCC may be associated with a carrier aggregation configuration or a dual connectivity configuration (e.g., when multiple serving cells have suboptimal backhaul link). An eCC may also be configured for use in unlicensed spectrum or shared spectrum (e.g., where more than one operator is licensed to use the spectrum).

In some cases, an eCC may utilize a different transmission time interval (TTI) length than other component carriers (CCs), which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic TDD operation (i.e., it may switch from downlink to uplink operation for short bursts according to dynamic conditions).

Within wireless communications system 100, a UE 115 may identify a configuration of carriers that includes a carrier in an unlicensed radio frequency spectrum band and a carrier in a licensed radio frequency spectrum band. The UE 115 may receive a communication on the carrier in the unlicensed radio frequency spectrum band during a downlink portion of a TxOP. UE 115 may transmit one or more CTS signals on the carrier in the licensed radio frequency spectrum band during a time that at least partially overlaps the downlink portion of the TxOP.

A base station 105 may identify a configuration of carriers that includes a carrier in an unlicensed radio frequency spectrum band and a carrier in a licensed radio frequency spectrum band. The base station 105 may transmit on the carrier in the unlicensed radio frequency spectrum band during a downlink portion TxOP. The base station 105 may transmit one or more RTS signals on the carrier in the licensed radio frequency spectrum band during a time that at least partially overlaps the downlink portion of the TxOP.

As described below, the license assisted RTS and CTS may be employed to avoid interfering communications from devices with wireless communications system 100. For example, RTS and CTS signals may be transmitted in licensed spectrum to ameliorate issues due to hidden nodes within wireless communications system 100.

Figure 2:
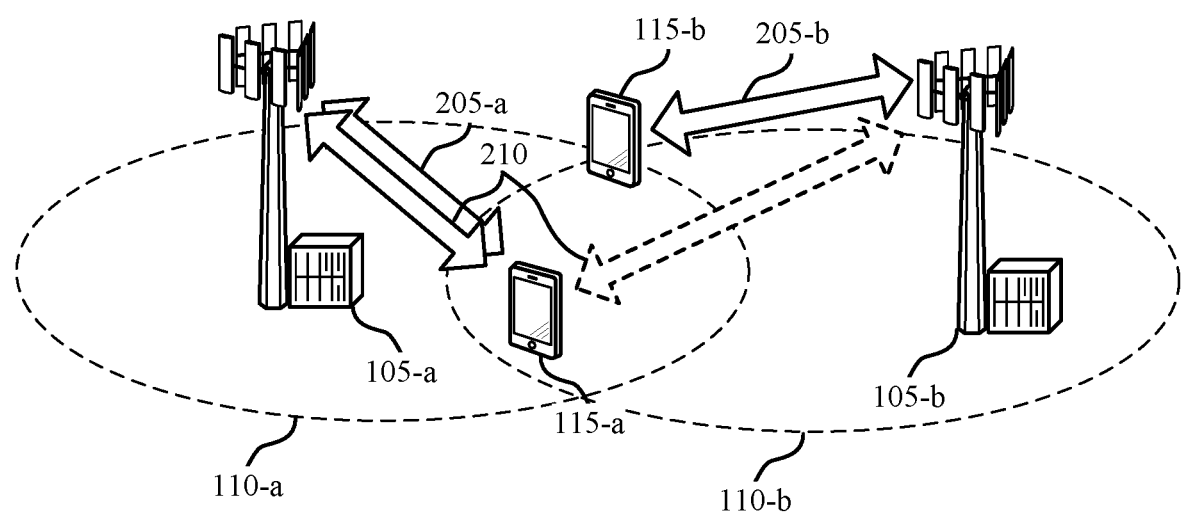
FIG. 2 illustrates an example of a wireless communications system that supports license assisted RTS and CTS transmission in accordance with aspects of the present disclosure.

FIG. 2 illustrates an example of a wireless communications system 200 that supports license assisted RTS and CTS transmission in accordance with aspects of the present disclosure. Wireless communications system 200 may include UE 115-a and UE 115-b, which may be an example of a UE 115 as described with reference to FIG. 1. Wireless communications system 200 may also include base station 105-a and base station 105-b, which may be an example of a base station 105 as described with reference to FIG. 1. Wireless communications system 200 may support RTS and CTS transmission in licensed spectrum concurrent with communication in unlicensed spectrum.

In some wireless systems, UE 115-a, UE 115-b, base station 105-a and base station 105-b may be configured for both licensed and unlicensed transmission. In some cases, a UE 115 and a base station 105 may communicate using a carrier 205, which may be in an unlicensed RF spectrum band. In some examples, the carrier 205 may be configured as a TDD carrier. In some cases, UE 115-a and base station 105-a may primarily communicate in unlicensed spectrum using carrier 205-a, while UE 115-b and base station 105-b may primarily communicate in unlicensed spectrum using carrier 205-b.

Each base station 105 may perform an LBT procedure prior to communicating on the respective carriers 205, and may transmit an RTS signal in an unlicensed RF spectrum band if the transmission medium is available. The receiving UE 115 may transmit a CTS signal in an unlicensed RF spectrum band in response to the RTS signal. In some cases, while communicating in an unlicensed RF spectrum band with base station 105-a, UE 115-a may transmit a CTS signal in the licensed spectrum, for example, on carrier 210. Specific resources may be set aside in the licensed spectrum for CTS transmission. Additionally or alternatively, CTS transmissions in licensed spectrum may overlap with an uplink portion of a TxOP, or portions of both an uplink and downlink TxOP.

Base station 105-a may perform an LBT procedure and transmit an initial RTS signal in the unlicensed spectrum if a transmission medium is available. In response to the RTS signal, UE 115-a may transmit an initial CTS signal in the unlicensed spectrum. UE 115-a may then transmit the CTS signal on carrier 210 while communicating with base station 105-a in the unlicensed spectrum. In some examples, carrier 210 may be configured for FDD.

UE 115-a may transmit CTS signals in a licensed RF spectrum band during unlicensed downlink TTIs. That is, in some examples, UE 115-a may transmit CTS signals on carrier 210 while receiving unlicensed downlink transmissions on carrier 205-a from base station 105-a. In some examples, the CTS signals transmitted on carrier 210 may be received by base station 105-b, and base station 105-b may yield the unlicensed RF spectrum band to base station 105-a. In some examples, while transmitting on the unlicensed spectrum, base station 105-b may receive the CTS on the licensed spectrum.

Additionally or alternatively, RTS signals may be transmitted in the licensed spectrum (e.g., by serving base station 105-a on carrier 210). If the RTS or CTS is not decoded by a non-serving node, the non-serving node may still determine to yield the medium transmission based on energy detection on resources reserved in the licensed spectrum for RTS and CTS transmission. In some examples, a different energy detection may be applied for unlicensed spectrum, for example, to account for differentiating carrier frequencies and unlicensed spectrum transmission.

Specific resources may be set aside or reserved in the licensed spectrum for CTS (or, RTS) transmission. In some cases, there may be a separate portion of a licensed RF spectrum band for each CTS in the unlicensed channel. In one example, there may be a common frequency band for the CTS, which may be used for all unlicensed channels. If there is a common frequency band for RTS/CTS in the licensed spectrum, the payload of the CTS may convey a channel index of the unlicensed band.

In some cases, CTS may be transmitted using frequency hopping. This may reduce overloading of CTS channels in the licensed spectrum. In some cases, the transmission power of the CTS may be selected independently of the communication in unlicensed spectrum. In some cases, the transmission power may be selected based on differences in path loss between the licensed and unlicensed spectrum.

In some cases, the CTS transmission may carry a payload decodable by a serving base station 105. The CTS transmission may be decoded by nodes of the same or different deployment, for example, based on a transmission duration, priority, or tolerated interference.

Figure 3:
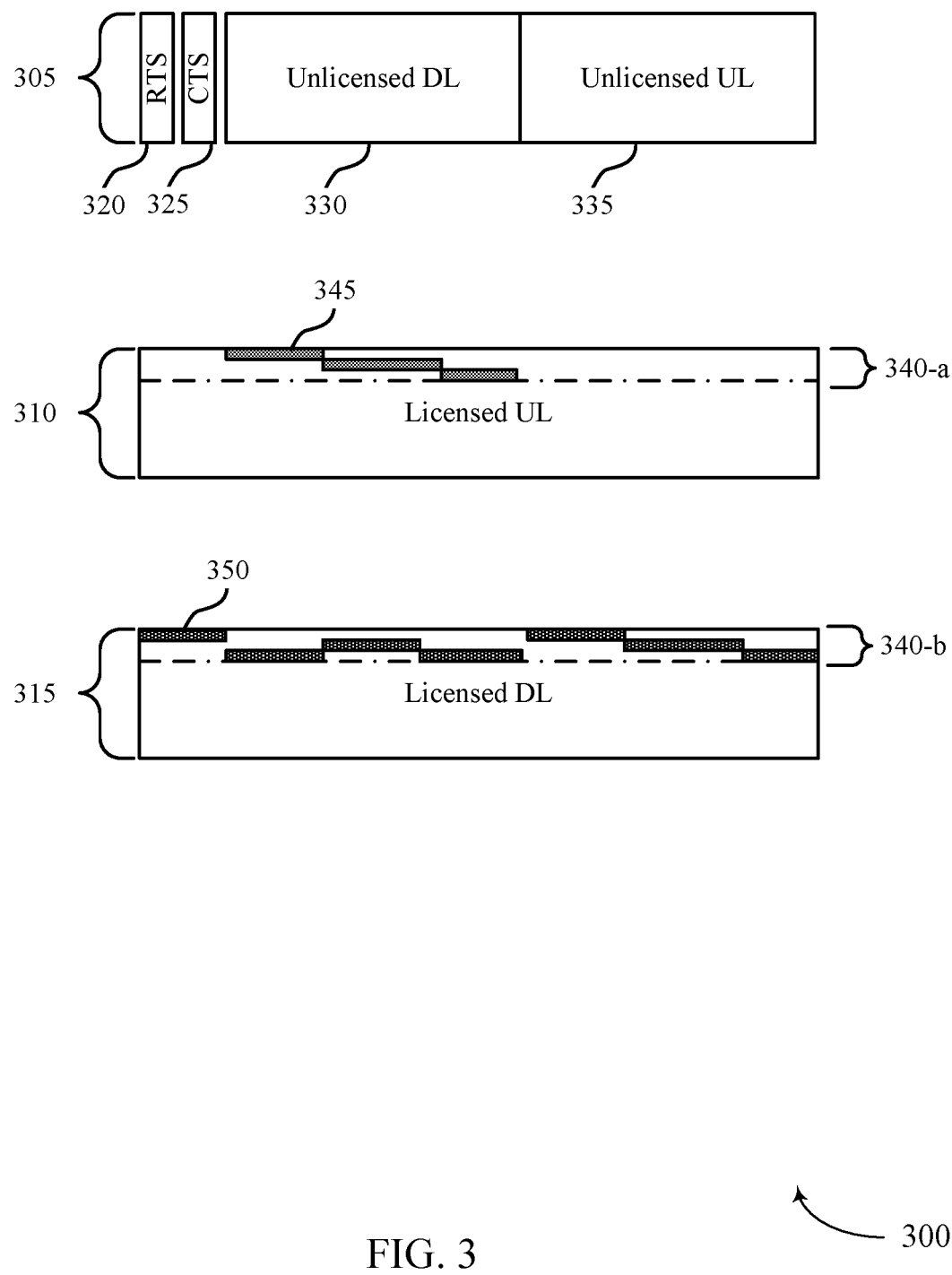
FIGS. 3 and 4 illustrate examples of coordinated communications in a system that supports license assisted RTS and CTS transmission in accordance with aspects of the present disclosure.

FIG. 3 illustrates an example of coordinated communications 300 in a system that supports license assisted RTS and CTS transmission in accordance with aspects of the present disclosure. Coordinated communications 300 may be an example of communications between a UE 115 and a base station 105 as described with reference to FIG. 1. Coordinated communications 300 may be an example of RTS and CTS transmission in licensed spectrum with concurrent communication in unlicensed spectrum.

A UE 115 and a base station 105 may be configured for transmission on a carrier in unlicensed RF spectrum band 305 and for a carrier in a licensed RF spectrum band, where the licensed RF spectrum band may include uplink portion 310 and downlink portion 315. The carrier in the unlicensed RF spectrum band 305 may be configured for TDD, while the carrier in the licensed RF spectrum band may be an FDD carrier, including uplink portion 310 and downlink portion 315.

In some cases, a UE 115 and a base station 105 may be configured to communicate on a FDD configured carrier in licensed spectrum. For example, the UE 115 may be configured to transmit in uplink portion 310 of an licensed RF spectrum band.

In some cases, a base station may be configured for downlink transmission in downlink portion 315 of a licensed RF spectrum band. In such cases, the licensed RF spectrum band may be an anchor carrier that facilitates communications on unlicensed RF spectrum band 305.

In unlicensed RF spectrum band 305, a base station 105 may perform a LBT procedure and subsequently transmit RTS signal 320 if the transmission medium is available. In some cases, RTS signal 320 may be transmitted in an unlicensed RF spectrum band. RTS signal 320 may indicate to the UE 115 that the base station 105 has information to transmit to the UE 115.

Upon receiving RTS signal 320 from the base station 105, the UE 115 may broadcast CTS signal 325 to all surrounding devices within communication range. CTS signal 325 may be transmitted in an unlicensed RF spectrum band. CTS signal 325 may prompt transmission from the serving base station and indicate to non-serving devices which resources may be used for transmission between the UE 115 and the serving base station 105.

In some configurations, an unlicensed downlink transmission 330 (i.e., a downlink transmission on a carrier in the unlicensed RF spectrum band 305) may follow the CTS signal 325. Unlicensed downlink transmission 330 may transmit information from a base station 105 to a UE 115 based on CTS signal 325.

In some cases, resources in the licensed RF spectrum band may be set aside for CTS transmission. For example, licensed CTS band 340-a may be allocated for CTS transmission. In some cases, licensed CTS band 340-a may be semi-statically set aside or reserved.

Similarly, resources in the licensed RF spectrum band may be set aside for RTS transmission. For example, licensed RTS band 340-b may be allocated for RTS transmission. Licensed RTS band 340-b may similarly be semi-statically set aside or reserved.

In some examples, a UE 115 may transmit a CTS signal 345 on licensed CTS band 340-a. The UE 115 may transmit CTS signal 345 at the same time that the UE 115 receives the unlicensed downlink transmission 330. In some cases, a non-serving base station 105 may transmit at the same time as a serving base station 105, but if the non-serving base station 105 detects CTS signal 345, the non-serving base station 105 may defer transmission (e.g., refrain from transmitting) to the serving base station 105. In some examples, CTS signal 345 may hop across frequencies (e.g., frequency hopping may be employed for the CTS signal 345) in the RF spectrum band. Additionally or alternatively, CTS signal 345 may be power controlled based on differences in path loss between licensed and unlicensed RF spectrum bands.

The serving base station 105 may transmit an RTS signal 350 on licensed RTS band 340-b. The serving base station 105 may transmit RTS signal 350 during any time of the transmissions on the carrier in unlicensed RF spectrum band 305 (i.e., during RTS signal 320, CTS signal 325, unlicensed downlink transmission 330 or unlicensed uplink transmission 335).

Figure 4:
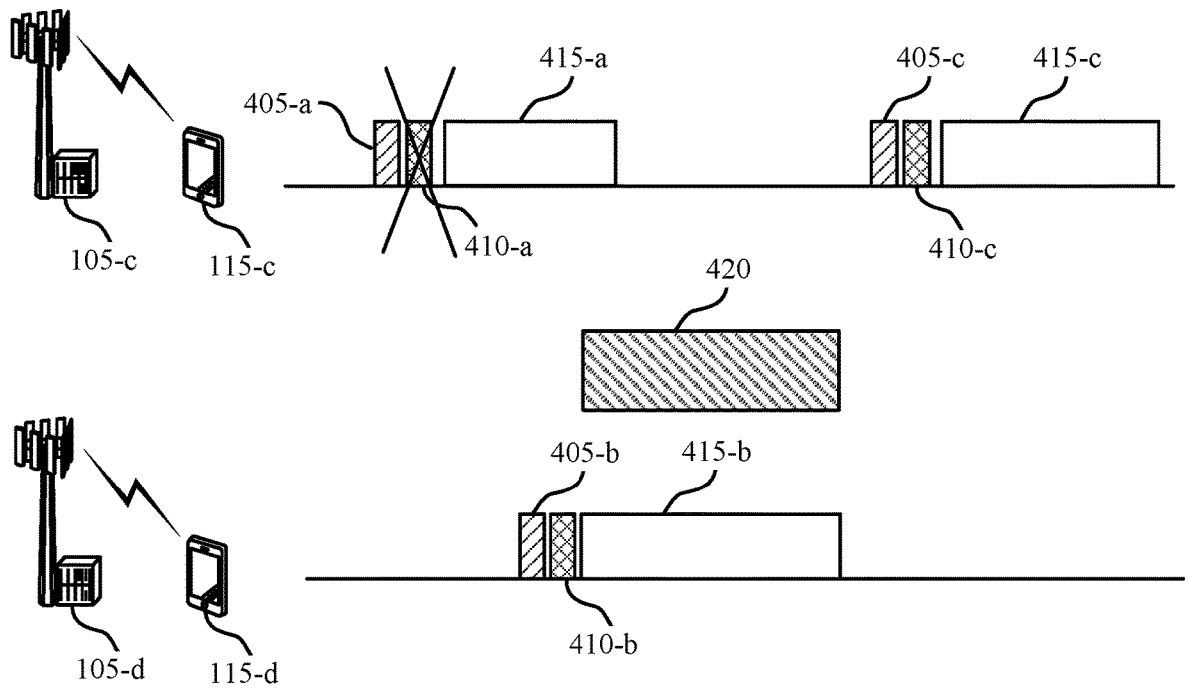

FIG. 4 illustrates an example of coordinated communications 400 in a system that supports license assisted RTS and CTS transmission in accordance with aspects of the present disclosure. Coordinated communications 400 may include base station 105-c and base station 105-d, which may be examples of a base station 105 as described with reference to FIG. 1. Coordinated communications 400 may further include UE 115-c and UE 115-d, which may be examples of a UE 115 as described with reference to FIG. 1. Coordinated communications 400 may be an example in which base station 105-d and UE 115-d use RTS/CTS in licensed spectrum to avoid collisions with base station 105-c and UE 115-c while communicating in unlicensed spectrum.

Coordinated communications 400 illustrates an example of communication in unlicensed spectrum in which base station 105-d fails to detect an RTS/CTS exchange between base station 105-c and UE 115-c. Therefore, base station 105-d may proceed to transmit on top of the communication between base station 105-c and UE 115-c. Base station 105-d and UE 115-d may, however, transmit RTS and/or CTS signals 420 on licensed spectrum to avoid further collision.

In some cases, CTS signal 410-a from UE 115-c may not be properly decoded by base station 105-d during communication in unlicensed RF spectrum. In another example, UE 115-d may transmit CTS signal 420 in a licensed RF spectrum band while receiving unlicensed downlink transmissions, and the non-serving base stations 105 (e.g., base station 105-c) that may receive CTS signal 420 may defer transmission and accordingly truncate any current downlink transmissions. In another example, base station 105-d may properly detect CTS transmissions, and CTS signal 420 or an RTS signal transmitted on licensed spectrum may not be transmitted.

Base station 105-*c* may perform an LBT procedure and transmit RTS signal 405-*a* to UE 115-*c* if the transmission medium is available. In some cases, RTS signal 405-*a* may be transmitted in an unlicensed RF spectrum band. RTS signal 405-*a* may indicate that base station 105-*c* has pending transmissions for UE 115-*c*. In some examples, UE 115-*d* may also receive and decode RTS signal 405-*a*.

UE 115-*c* may transmit CTS signal 410-*a* to base station 105-*c*. CTS signal 410-*a* may be transmitted in an unlicensed RF spectrum band. CTS signal 410-*a* may indicate to base station 105-*c* that UE 115-*c* is available to receive the pending transmissions as well as indicate to non-serving base stations (e.g., base station 105-*d*) that base station 105-*c* is about to transmit. However, base station 105-*d* may not properly receive CTS signal 410-*a*, and base station 105-*d* may not determine that base station 105-*c* is about to transmit.

In some cases, base station 105-*c* may transmit unlicensed DL data 415-*a* to UE 115-*c* based on CTS signal 410-*a*. Base station 105-*c* may truncate unlicensed DL data 415-*a* based on receiving a CTS signal from another UE 115.

In some cases, base station 105-*d* may perform an LBT procedure and broadcast RTS signal 405-*b* if the transmission medium is available. RTS signal 405-*b* may be transmitted in an unlicensed RF spectrum band. RTS signal 405-*b* may indicate that base station 105-*d* has pending downlink transmissions for UE 115-*d*. RTS signal 405-*b* may be transmitted during unlicensed DL data 415-*a*.

UE 115-*d* may transmit CTS signal 410-*b*, and base station 105-*d* may decode the transmission. CTS signal 410-*b* may be transmitted in an unlicensed RF spectrum band. CTS signal 410-*b* may indicate to a serving base station (e.g., base station 105-*d*) to transmit downlink information. However, in some cases, base station 105-*c* may not decode CTS signal 410-*b*, because base station 105-*c* may be transmitting unlicensed DL data 415-*a*. Base station 105-*c* may not detect that base station 105-*d* is transmitting based on CTS signal 410-*b*.

Base station 105-*d* may then transmit downlink data 415-*b*. In some examples, base station 105-*d* may be transmitting on the resources on which base station 105-*c* is using to transmit DL data 415-*a*, and the two unlicensed DL data transmissions may interfere with one another.

UE 115-*d* may transmit CTS signal 420 during unlicensed DL data 415-*a*. CTS signal 420 may be transmitted in a licensed RF spectrum band. CTS signal 420 may be transmitted on licensed resources semi-statically allocated for CTS signal transmission. Base station 105-*c* may receive CTS signal 420 and defer from transmission. In some examples, base station 105-*c* may truncate unlicensed DL data 415-*a* upon receiving CTS signal 420.

After unlicensed DL data 415-*b*, base station 105-*c* may perform an LBT procedure and transmit RTS signal 405-*c* if the transmission medium is clear. RTS signal 405-*c* may be transmitted in an unlicensed RF spectrum band. RTS signal 405-*c* may indicate to UE 115-*c* that base station 105-*c* has pending downlink transmissions.

UE 115-*c* may transmit CTS signal 410-*c* in an unlicensed RF spectrum band. CTS signal 410-*c* may indicate to base station 105-*d* that UE 115-*c* is ready for downlink information. In some examples, base station 105-*d* may receive CTS signal 410-*c* and defer from transmission.

Base station 105-*c* may transmit unlicensed DL data 415-*c* based on CTS signal 410-*c*. In some examples, unlicensed DL data 415-*c* may include information truncated from unlicensed DL data 415-*a*.

Figure 5:
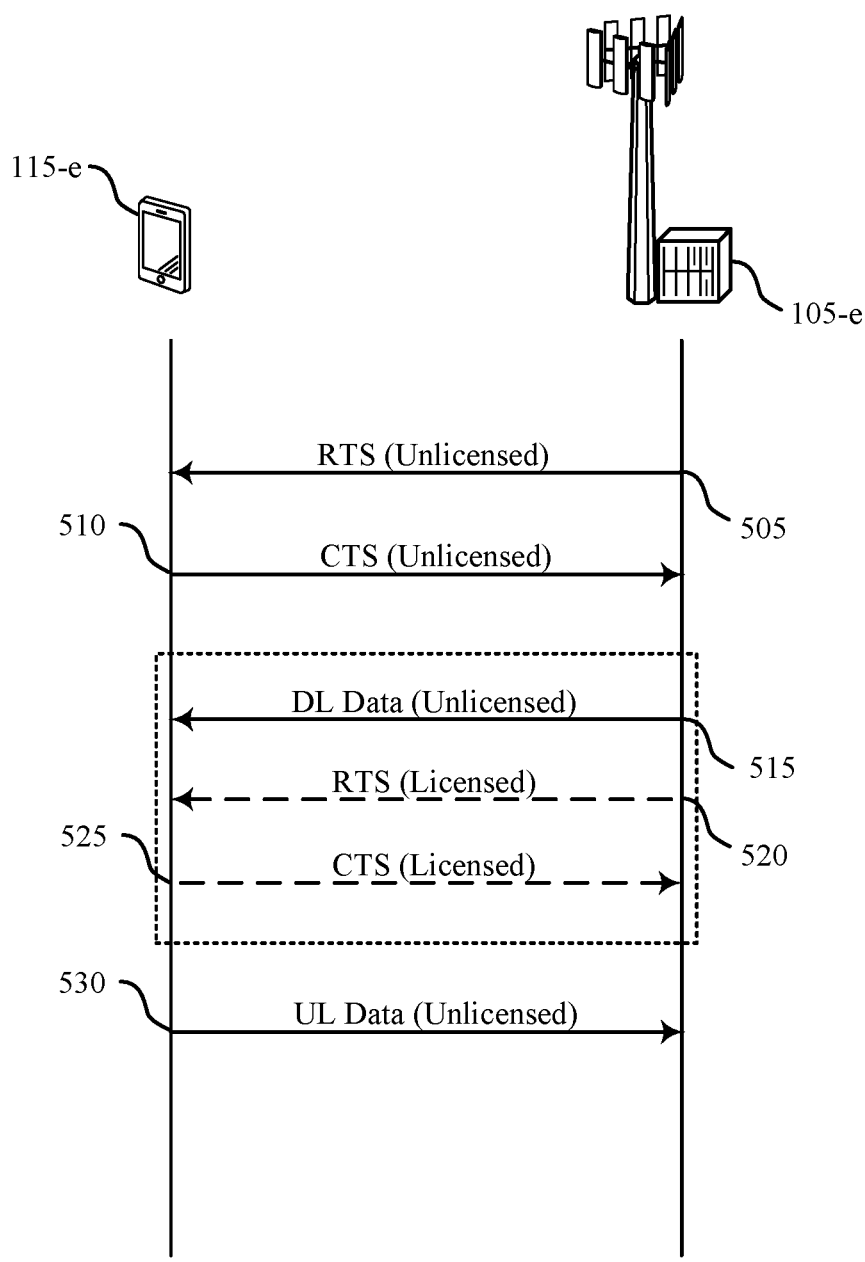
FIG. 5 illustrates an example of a process flow that supports license assisted RTS and CTS transmission in accordance with aspects of the present disclosure.

FIG. 5 illustrates an example of a process flow 500 that supports license assisted RTS and CTS transmission in accordance with aspects of the present disclosure. Process flow 500 may include UE 115-*e* and base station 105-*e*, which may be examples of a UE 115 and a base station 105 as described with reference to FIG. 1.

At 505, base station 105-*e* may transmit to UE 115-*e*, and UE 115-*e* may receive from base station 105-*e*, an RTS signal in an unlicensed RF spectrum band to UE 115-*e*. That is, base station 105-*e* may transmit an RTS signal on a carrier in an unlicensed RF spectrum band.

At 510, UE 115-*e* may broadcast a CTS transmission after receiving the RTS signal. That is, UE 115-*e* may transmit to base station 105-*e*, and base station 105-*e* may receive from UE 115-*e*, an initial CTS signal on an unlicensed carrier in response to the RTS signal.

At 515, base station 105-*e* may transmit to UE 115-*e*, and UE 115-*e* may receive from base station 105-*e*, downlink data in an unlicensed RF spectrum band. Base station 105-*e* may transmit a communication (e.g., downlink data) on a carrier in an unlicensed RF spectrum band during a downlink portion of a TxOP.

At 520, base station may transmit to UE 115-*e*, and UE 115-*e* may receive from base station 105-*e*, an RTS signal in a band of a licensed spectrum. Base station 105-*e* may transmit the RTS signal on a carrier in a licensed radio frequency spectrum band, in some examples, during a time that may partially overlap with a downlink portion of a TxOP.

At 525, UE 115-*e* may transmit to base station 105-*e*, and base station 105-*e* may receive from UE 115-*e*, a CTS signal over a band in a licensed RF spectrum band. That is, UE 115-*e* may transmit one or more CTS signals on a carrier in a licensed radio frequency spectrum band during a time that at least partially overlaps the downlink portion of the TxOP, and where the CTS signals may be transmitted based on receiving the communication of 520.

At 530, UE 115-*e* may transmit to base station 105-*e*, and base station 105-*e* may receive from UE 115-*e*, uplink data in a band of an unlicensed spectrum. For example, UE 115-*e* may uplink data during an uplink portion of a TxOP.

Figure 6:
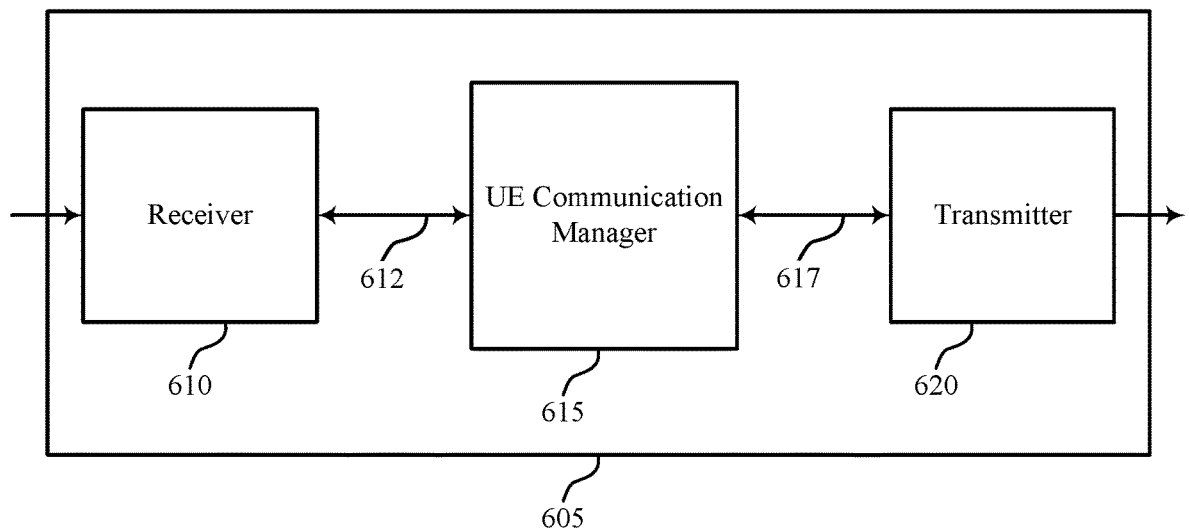
FIGS. 6 through 8 show block diagrams of a wireless device that supports license assisted RTS and CTS transmission in accordance with aspects of the present disclosure.

FIG. 6 shows a block diagram 600 of a wireless device 605 that supports license assisted RTS and CTS transmission in accordance with various aspects of the present disclosure. Wireless device 605 may be an example of aspects of a UE 115 as described with reference to FIG. 1. Wireless device 605 may include receiver 610, UE communication manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to license assisted RTS and CTS transmission, etc.). In some examples, receiver 610 may receive RTS signals or downlink transmissions from a base station 105. Information related to received signals may be passed on to other components of the device, for example, via link 612. The receiver 610 may be an example of aspects of the transceiver 935 described with reference to FIG. 9.

UE communication manager 615 may be an example of aspects of the UE communication manager 915 as described with reference to FIG. 9. UE communication manager 615 may identify a configuration of carriers that includes a carrier in an unlicensed radio frequency spectrum band and a carrier in a licensed radio frequency spectrum band, receive a communication on the carrier in the unlicensed radio frequency spectrum band during a downlink portion of a TxOP, and transmit one or more CTS signals on the carrier in the licensed radio frequency spectrum band during a time that at least partially overlaps the downlink portion of the TxOP, where the CTS signals are transmitted based on receiving the communication.

Transmitter 620 may transmit signals generated by other components of the device. In some cases, transmitter 620 may be in communication with UE communication manager 615 via link 617. Transmitter 620 may accordingly transmit signals received via link 617. In some examples, the transmitter 620 may be collocated with a receiver 610 in a transceiver module. For example, the transmitter 620 may be an example of aspects of the transceiver 935 as described with reference to FIG. 9. The transmitter 620 may include a single antenna, or it may include a set of antennas.

Figure 7:
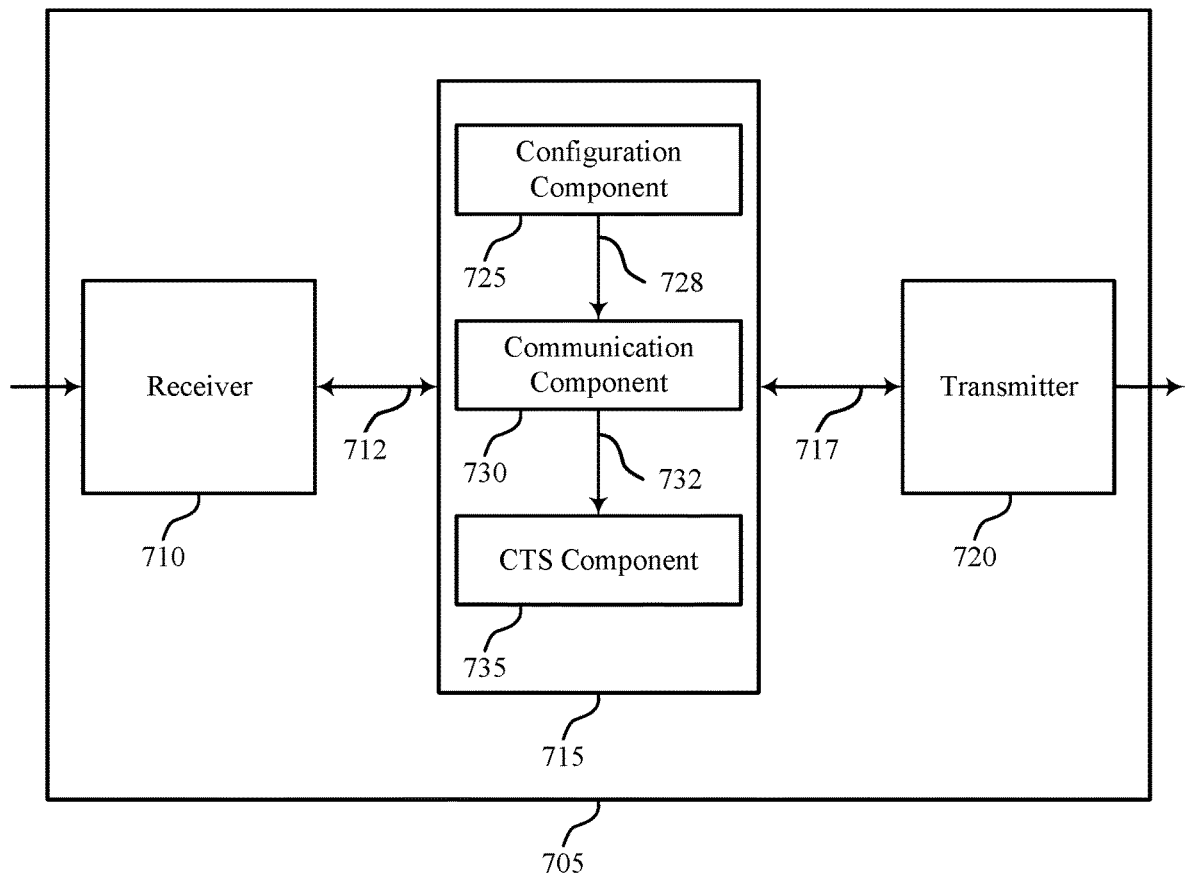

FIG. 7 shows a block diagram 700 of a wireless device 705 that supports license assisted RTS and CTS transmission in accordance with various aspects of the present disclosure. Wireless device 705 may be an example of aspects of a wireless device 605 or a UE 115 as described with reference to FIGS. 1 and 6. Wireless device 705 may include receiver 710, UE communication manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to license assisted RTS and CTS transmission, etc.). In some examples, receiver 710 may receive RTS signals or downlink transmissions from a base station 105. Information related to received signals may be passed on to other components of the device, for example, via link 712. The receiver 710 may be an example of aspects of the transceiver 935 as described with reference to FIG. 9.

UE communication manager 715 may be an example of aspects of the UE communication manager 915 as described with reference to FIG. 9. UE communication manager 715 may include configuration component 725, communication component 730, and CTS component 735.

Configuration component 725 may identify a configuration of carriers that includes a carrier in an unlicensed radio frequency spectrum band and a carrier in a licensed radio frequency spectrum band. In some cases, the carrier in the licensed radio frequency spectrum band is a FDD configured carrier. Configuration component 725 may then send information 728 to communication component 730, where the information may include the configurations for the carrier in the unlicensed radio frequency spectrum band and the carrier in the licensed radio frequency spectrum band.

Communication component 730 may receive a communication on the carrier in the unlicensed radio frequency spectrum band, for example, during a downlink portion of a TxOP. In some examples, the communication may include a data transmission. In some cases, a duration of time that at least partially overlaps the downlink portion of the TxOP includes a duration of the downlink portion of the TxOP. In some cases, the duration of the time that at least partially overlaps the downlink portion of the TxOP includes a duration of an uplink portion of the TxOP. Communication component 730 may then send information 732 to CTS component 735, where information 732 may correspond to and identify the overlapping portions of time. In some examples, the information 732 may include the resources used to receive the communication on the carrier in the unlicensed radio frequency spectrum band.

CTS component 735 may transmit one or more CTS signals (e.g., an initial CTS signal) in the unlicensed radio frequency spectrum band in response to a received RTS signal. In some examples, the one or more CTS signals may be transmitted in response to information 732 received from the communication component 730 (e.g., information regarding a received downlink communication). In some cases, the received information 732 may include an indication of an RTS signal. Subsequent communication (e.g., subsequent downlink data) may be responsive to the initial CTS signal. One or more CTS signals may then be transmitted on the carrier in the licensed radio frequency spectrum band during a time that at least partially overlaps the downlink portion of the TxOP, and where the CTS signals are transmitted based on receiving a communication, for example, downlink data. In some cases, the one or more CTS signals may be transmitted with a frequency hopping pattern using a set of frequency bands within the carrier in the licensed radio frequency spectrum band. The UE communication manager 715 may send information to transmitter 720 via link 717 in response to received information (e.g., information 732 regarding the communication received on the carrier in the unlicensed radio frequency spectrum band).

In some cases, a transmission power of the one or more CTS signals is based on a first path loss parameter that is different from a second path loss parameter of the transmission received using the carrier in the unlicensed radio frequency spectrum band. In some cases, the one or more CTS signals are transmitted using a frequency region of the carrier in the licensed radio frequency spectrum band designated for signaling associated with a set of unlicensed channels. In some cases, the one or more CTS signals include an indication of a channel of the carrier in the unlicensed radio frequency spectrum band, where the transmission is received on the channel.

Transmitter 720 may transmit signals (e.g., one or more CTS signals) generated by other components of the device. In some cases, transmitter 720 may be in communication with and receive data from UE communication manager 715 via link 717. In some examples, the transmitter 720 may be collocated with a receiver 710 in a transceiver module. For example, the transmitter 720 may be an example of aspects of the transceiver 935 as described with reference to FIG. 9. The transmitter 720 may include a single antenna, or it may include a set of antennas.

Figure 8:
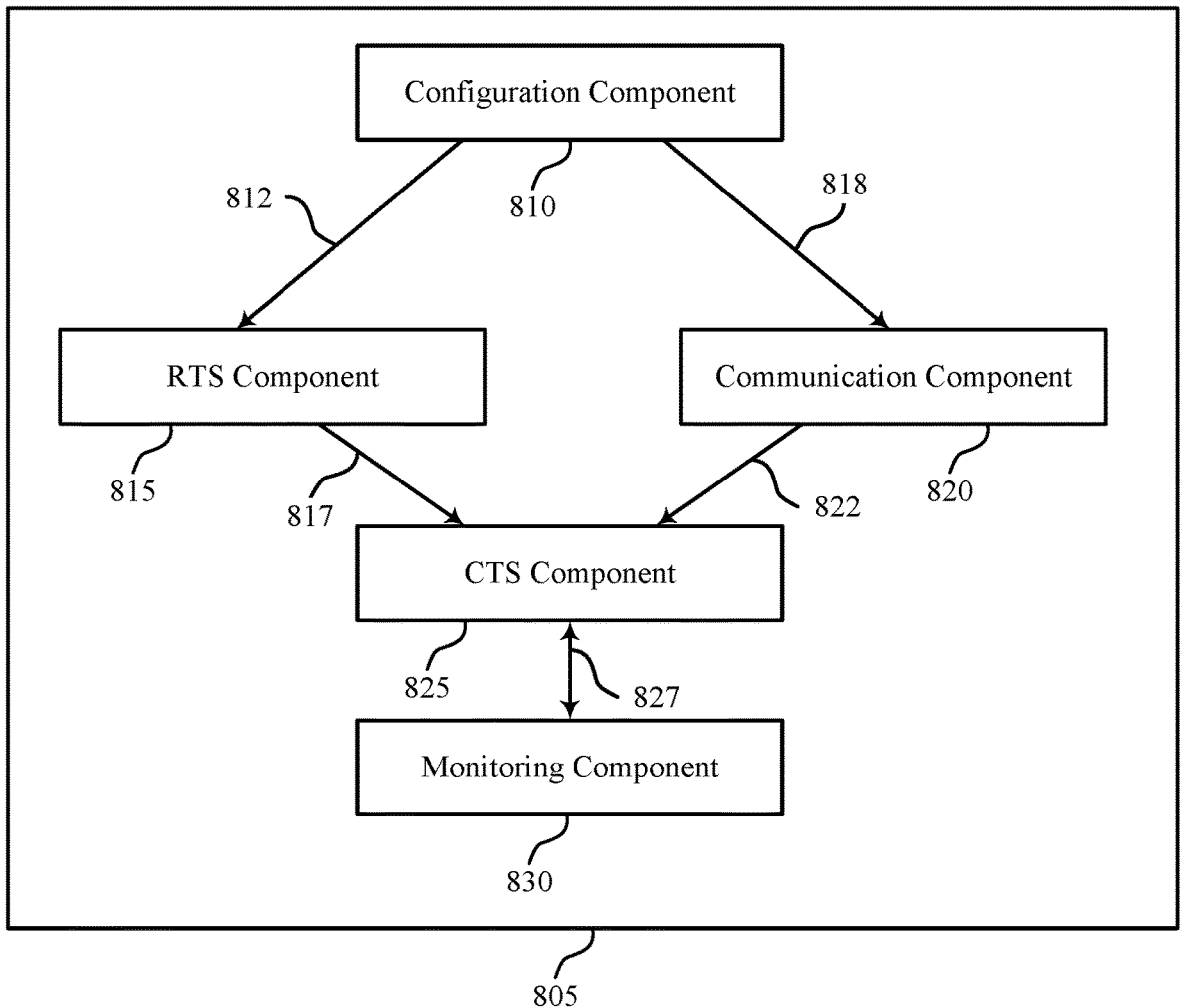

FIG. 8 shows a block diagram 800 of a UE communication manager 805 that supports license assisted RTS and CTS transmission in accordance with various aspects of the present disclosure. The UE communication manager 805 may be an example of aspects of a UE communication manager 615, a UE communication manager 715, or a UE communication manager 915 as described with reference to FIGS. 6, 7, and 9. The UE communication manager 805 may include configuration component 810, RTS component 815, communication component 820, CTS component 825, and monitoring component 830. Each of these modules may communicate, directly or indirectly, with one another (e.g., via one or more buses).

Configuration component 810 may initially identify a configuration of carriers that may include a carrier in an unlicensed radio frequency spectrum band and a carrier in a licensed radio frequency spectrum band. In some cases, the carrier in the licensed radio frequency spectrum band may be a FDD configured carrier. Configuration component 810 may, in some cases, send information corresponding to the carrier in the unlicensed radio frequency spectrum band and the carrier in the licensed radio frequency spectrum band to RTS component 815 via link 812, to communication component 820 via link 818, or both.

In some cases, RTS component 815 may receive an RTS signal on the carrier in the unlicensed radio frequency spectrum band. The RTS signal may be received on the carrier in the unlicensed radio frequency spectrum band as identified by configuration component 810. RTS component 815 may then send information corresponding to the received RTS signal to CTS component 825 via link 817.

CTS component 825 may, in response to receiving the information via link 817 corresponding to a received RTS signal, transmit an initial CTS signal on, for example, an unlicensed carrier, based on having received the RTS signal.

In some cases, communication component 820 may receive a communication (e.g., downlink data) on the carrier in the unlicensed radio frequency spectrum band during a downlink portion of a TxOP. The communication may be received on the carrier in the unlicensed radio frequency spectrum band as identified by configuration component 810. In some cases, the communication may be received in response to the transmitted initial CTS signal. Communication component 820 may then send information corresponding to the received communication to CTS component 825 via link 822.

CTS component 825 may, in response to receiving the information via link 822 corresponding to a received communication (e.g., downlink data), transmit one or more further CTS signals based on having received the communication. In some cases, the one or more CTS signals may be transmitted on the carrier in the licensed radio frequency spectrum band during a time that at least partially overlaps the downlink portion of the TxOP. CTS component 825 may then send information corresponding to the one or more further transmitted CTS signals to monitoring component 830 via link 827. Additionally or alternatively, CTS component 825 may receive information from monitoring component 830 via link 827.

Monitoring component 830 may, after receiving the information via link 827, monitor the carrier in the unlicensed radio frequency spectrum band and the carrier in the licensed radio frequency spectrum band for an additional CTS signal from a neighboring device. In some cases, the carrier in the licensed radio frequency spectrum band is monitored using a first energy detection threshold and the carrier in the unlicensed radio frequency spectrum band is monitored using a second energy detection threshold different from the first energy detection threshold. In some cases, monitoring component 830 may send information from monitoring the carrier in the unlicensed radio frequency spectrum band and the carrier in the licensed radio frequency spectrum band, for example, information indicating a detected additional CTS signal, to CTS component 825 via link 827.

Figure 9:
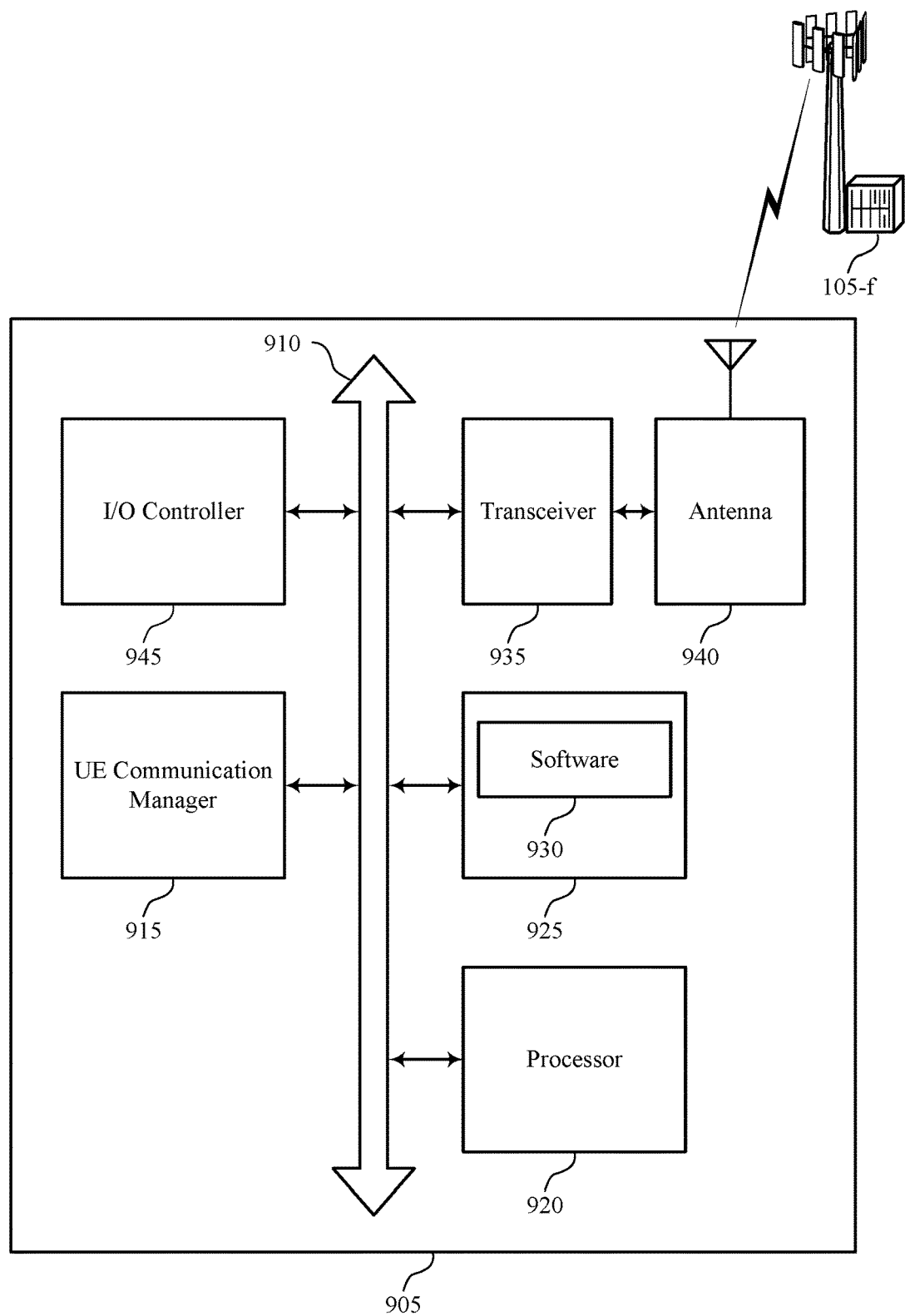
FIG. 9 illustrates a block diagram of a system including a UE that supports license assisted RTS and CTS transmission in accordance with aspects of the present disclosure.

FIG. 9 illustrates a block diagram of a system 900 including a device 905 that supports license assisted RTS and CTS transmission in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE communication manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting license assisted RTS and CTS transmission).

Memory 925 may include random access memory (RAM) and read only memory (ROM). The memory 925 may store computer-readable, computer-executable software including instructions that, when executed, cause the processor to perform various functions described herein. In some cases, the memory 925 may contain, among other things, a Basic Input-Output system (BIOS) which may control basic hardware and/or software operation such as the interaction with peripheral components or devices.

Software 930 may include code to implement aspects of the present disclosure, including code to support license assisted RTS and CTS transmission. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
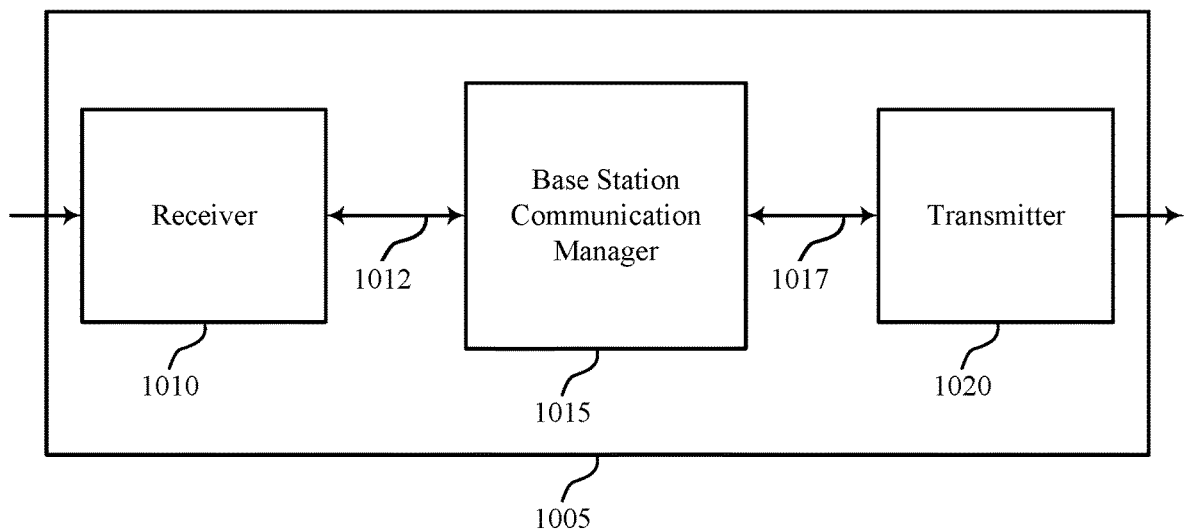
FIGS. 10 through 12 show block diagrams of a wireless device that supports license assisted RTS and CTS transmission in accordance with aspects of the present disclosure.

FIG. 10 shows a block diagram 1000 of a wireless device 1005 that supports license assisted RTS and CTS transmission in accordance with various aspects of the present disclosure. Wireless device 1005 may be an example of aspects of a base station 105 as described with reference to FIG. 1. Wireless device 1005 may include receiver 1010, base station communication manager 1015, and transmitter 1020. Wireless device 1005 may also include a processor.

Each of these components may be in communication with one another (e.g., via one or more buses).

Receiver 1010 may receive information such as packets, user data, or control information associated with various information channels (e.g., control channels, data channels, and information related to license assisted RTS and CTS transmission, etc.). Information regarding received signals may be passed on to other components of the device, for example, via link 1012. The receiver 1010 may be an example of aspects of the transceiver 1335 as described with reference to FIG. 13.

Base station communication manager 1015 may be an example of aspects of the base station communication manager 1315 as described with reference to FIG. 13. Base station communication manager 1015 may identify a configuration of carriers that includes a carrier in an unlicensed radio frequency spectrum band and a carrier in a licensed radio frequency spectrum band, transmit a communication on the carrier in the unlicensed radio frequency spectrum band during a downlink portion of a TxOP, and transmit one or more RTS signals on the carrier in the licensed radio frequency spectrum band during a time that at least partially overlaps the downlink portion of the TxOP, where the one or more RTS signals are transmitted based on transmitting the communication. The base station communication manager 1015 may transmit the communication or the RTS signals based on information received from the receiver 1010 via link 1012.

Transmitter 1020 may transmit signals generated by other components of the device. In some cases, transmitter 1020 may be in communication with base station communication manager 1015 via link 1017. Transmitter 1020 may accordingly transmit signals received via link 1017. In some examples, the transmitter 1020 may be collocated with a receiver 1010 in a transceiver module. For example, the transmitter 1020 may be an example of aspects of the transceiver 1335 as described with reference to FIG. 13. The transmitter 1020 may include a single antenna, or it may include a set of antennas.

Figure 11:
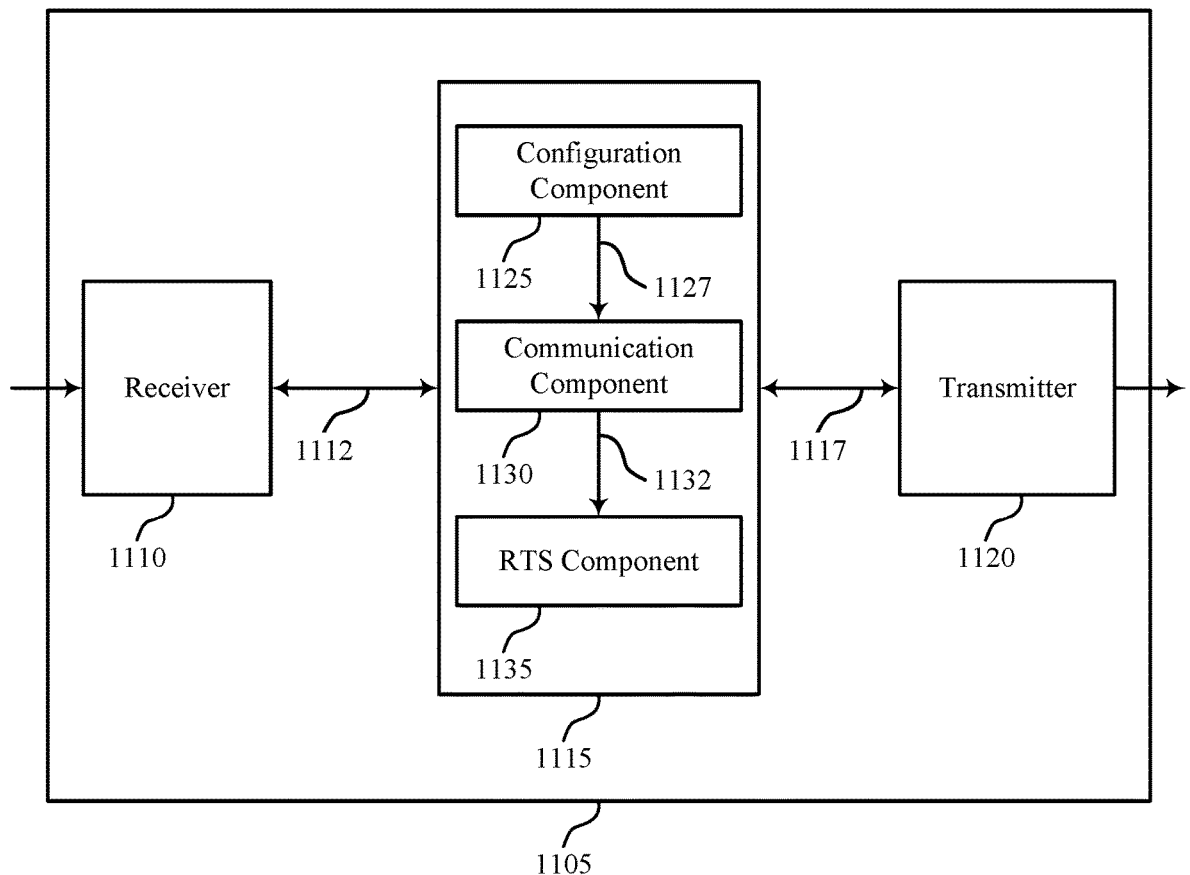

FIG. 11 shows a block diagram 1100 of a wireless device 1105 that supports license assisted RTS and CTS transmission in accordance with various aspects of the present disclosure. Wireless device 1105 may be an example of aspects of a wireless device 1005 or a base station 105 as described with reference to FIGS. 1 and 10. Wireless device 1105 may include receiver 1110, base station communication manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to license assisted RTS and CTS transmission, etc.). Information may be passed on to other components of the device, for example, via link 1112. The receiver 1110 may be an example of aspects of the transceiver 1335 as described with reference to FIG. 13.

Base station communication manager 1115 may be an example of aspects of the base station communication manager 1315 as described with reference to FIG. 13. Base station communication manager 1115 may also include configuration component 1125, communication component 1130, and RTS component 1135.

Configuration component 1125 may identify a configuration of carriers that includes a carrier in an unlicensed radio frequency spectrum band and a carrier in a licensed radio frequency spectrum band and transmit an initial RTS signal using the carrier in the unlicensed radio frequency spectrum band. Configuration component 1125 may then send information 1127 to communication component 1130, where the information may include the configurations for the carrier in the unlicensed radio frequency spectrum band and the carrier in the licensed radio frequency spectrum band.

Communication component 1130 may transmit a communication on the carrier in the unlicensed radio frequency spectrum band, for example, during a downlink portion of a TxOP. In some cases, a duration of the time that at least partially overlaps the downlink portion of the TxOP may include a duration of the downlink portion of the TxOP. In some cases, the duration of the time that at least partially overlaps the downlink portion of the TxOP includes a duration of an uplink portion of the TxOP. Communication component 1130 may then send information 1132 to RTS component 1135, where information 1132 may correspond to and identify the overlapping portions of time. In some examples, the information 1132 may identify the resources used to transmit the communication on the carrier in the unlicensed radio frequency spectrum band.

RTS component 1135 may transmit one or more RTS signals on the carrier in the licensed radio frequency spectrum band. In some cases, the RTS signal may be transmitted during a time that at least partially overlaps the downlink portion of the TxOP, and where the one or more RTS signals are transmitted based on transmitting the communication. In some cases, the one or more RTS signals may be transmitted with a frequency hopping pattern using a set of frequency bands of the carrier in the licensed radio frequency spectrum band. In some examples, the RTS component may transmit the RTS signals based on the information 1132 (e.g., information regarding the received communication) received from the communication component 1130.

In some cases, a transmission power of the one or more RTS signals may be based on a first path loss parameter that is different from a second path loss parameter of the communication transmitted on the carrier in the licensed radio frequency spectrum band. In some cases, the one or more RTS signals may be transmitted using a frequency region of the carrier in the licensed radio frequency spectrum band designated for signaling associated with a set of unlicensed channels. In some cases, the one or more RTS signals may include an indication of a channel of the carrier in the unlicensed radio frequency spectrum band, where the communication is transmitted on the channel.

Transmitter 1120 may transmit signals generated by other components of the device. In some cases, transmitter 1120 may be in communication with and receive data from base station communication manager 1115 via link 1117. In some examples, the transmitter 1120 may be collocated with a receiver 1110 in a transceiver module. For example, the transmitter 1120 may be an example of aspects of the transceiver 1335 as described with reference to FIG. 13. The transmitter 1120 may include a single antenna, or it may include a set of antennas.

Figure 12:
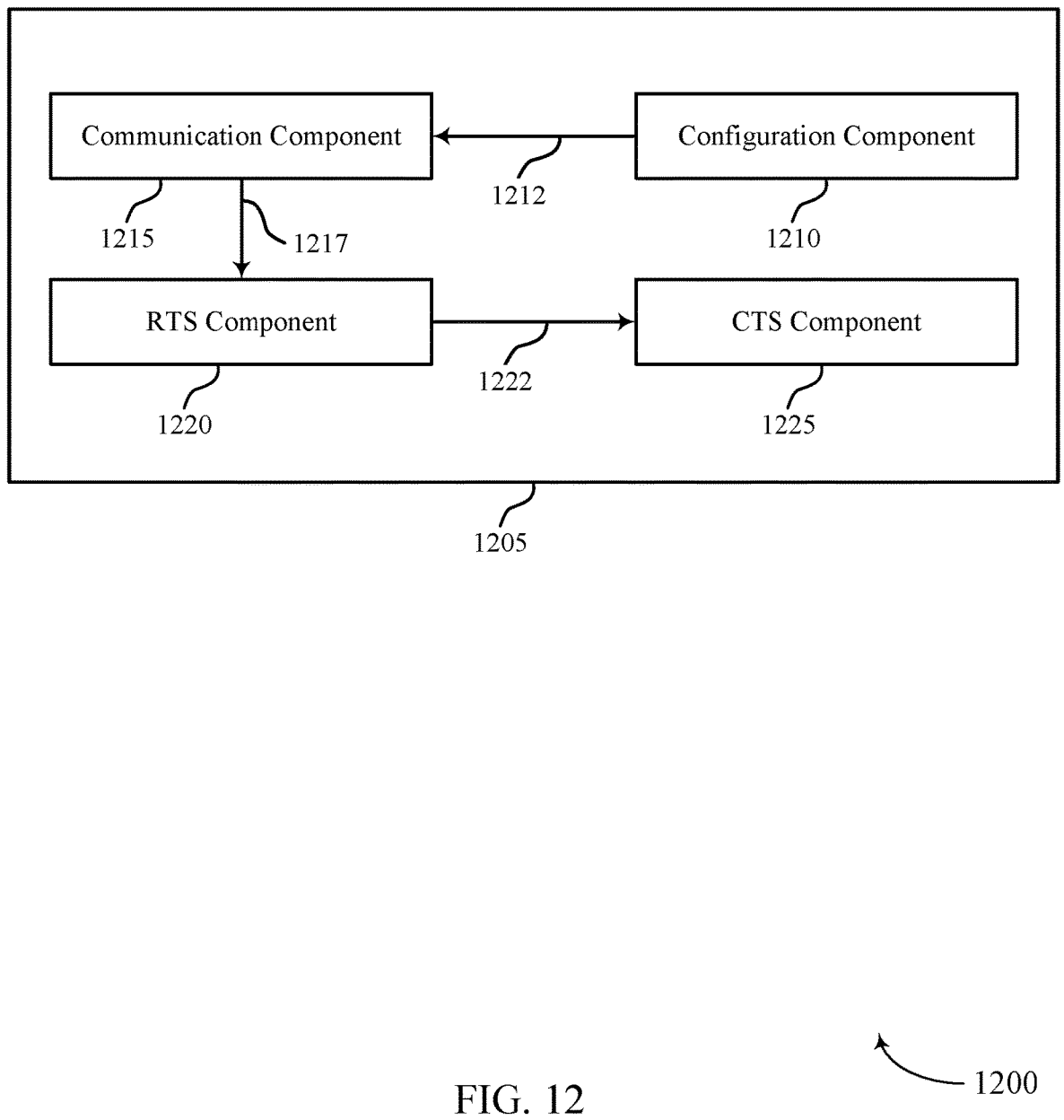

FIG. 12 shows a block diagram 1200 of a base station communication manager 1205 that supports license assisted RTS and CTS transmission in accordance with various aspects of the present disclosure. The base station communication manager 1205 may be an example of aspects of a base station communication manager 1315 as described with reference to FIGS. 10, 11, and 13. The base station communication manager 1205 may include configuration component 1210, communication component 1215, RTS component 1220, and CTS component 1225. Each of these modules may communicate, directly or indirectly, with one another (e.g., via one or more buses).

Configuration component 1210 may initially identify a configuration of carriers that may include a carrier in an unlicensed radio frequency spectrum band and a carrier in a licensed radio frequency spectrum band. Configuration component 1210 may, in some cases, send information corresponding to the carrier in the unlicensed radio frequency spectrum band and the carrier in the licensed radio frequency spectrum band to communication component 1215 via link 1212. In some cases, configuration component 1210 may transmit an initial RTS signal using the carrier in the unlicensed radio frequency spectrum band.

Communication component 1215 may transmit a communication (e.g., downlink data) on the carrier in the unlicensed radio frequency spectrum band during a downlink portion of a TxOP. In some cases, a duration of the time that at least partially overlaps the downlink portion of the TxOP may include a duration of the downlink portion of the TxOP. In some cases, the duration of the time that at least partially overlaps the downlink portion of the TxOP may include a duration of an uplink portion of the TxOP. In some cases, the communication may be sent in response to a received initial CTS signal. Communication component 1215 may then send information corresponding to the transmitted communication to RTS component 1220 via link 1217.

RTS component 1220 may transmit one or more RTS signals on the carrier in the licensed radio frequency spectrum band. In some cases, the one or more RTS signals may be transmitted based on having transmitted the communication (e.g., the transmitted downlink data). In some cases, the one or more RTS signals may be transmitted during a time that at least partially overlaps the downlink portion of the TxOP. In some cases, the one or more RTS signals may be transmitted with a frequency hopping pattern using a set of frequency bands of the carrier in the licensed radio frequency spectrum band. In some cases, a transmission power of the one or more RTS signals may be based on a first path loss parameter that is different from a second path loss parameter of the communication transmitted on the carrier in the licensed radio frequency spectrum band. In some cases, the one or more RTS signals may be transmitted using a frequency region of the carrier in the licensed radio frequency spectrum band designated for signaling associated with a set of unlicensed channels. In some cases, the one or more RTS signals may include an indication of a channel of the carrier in the unlicensed radio frequency spectrum band, where the communication is transmitted on the channel.

RTS component 1220 may then send information corresponding to the transmitted RTS signals to CTS component 1225 via link 1222. CTS component 1225 may correspondingly receive the information via link 1222, and subsequently receive a CTS signal. In some cases, the CTS signal may be received in response to the transmitted RTS signal. In some cases, the CTS signal may be received on a carrier in the licensed radio frequency spectrum band.

Figure 13:
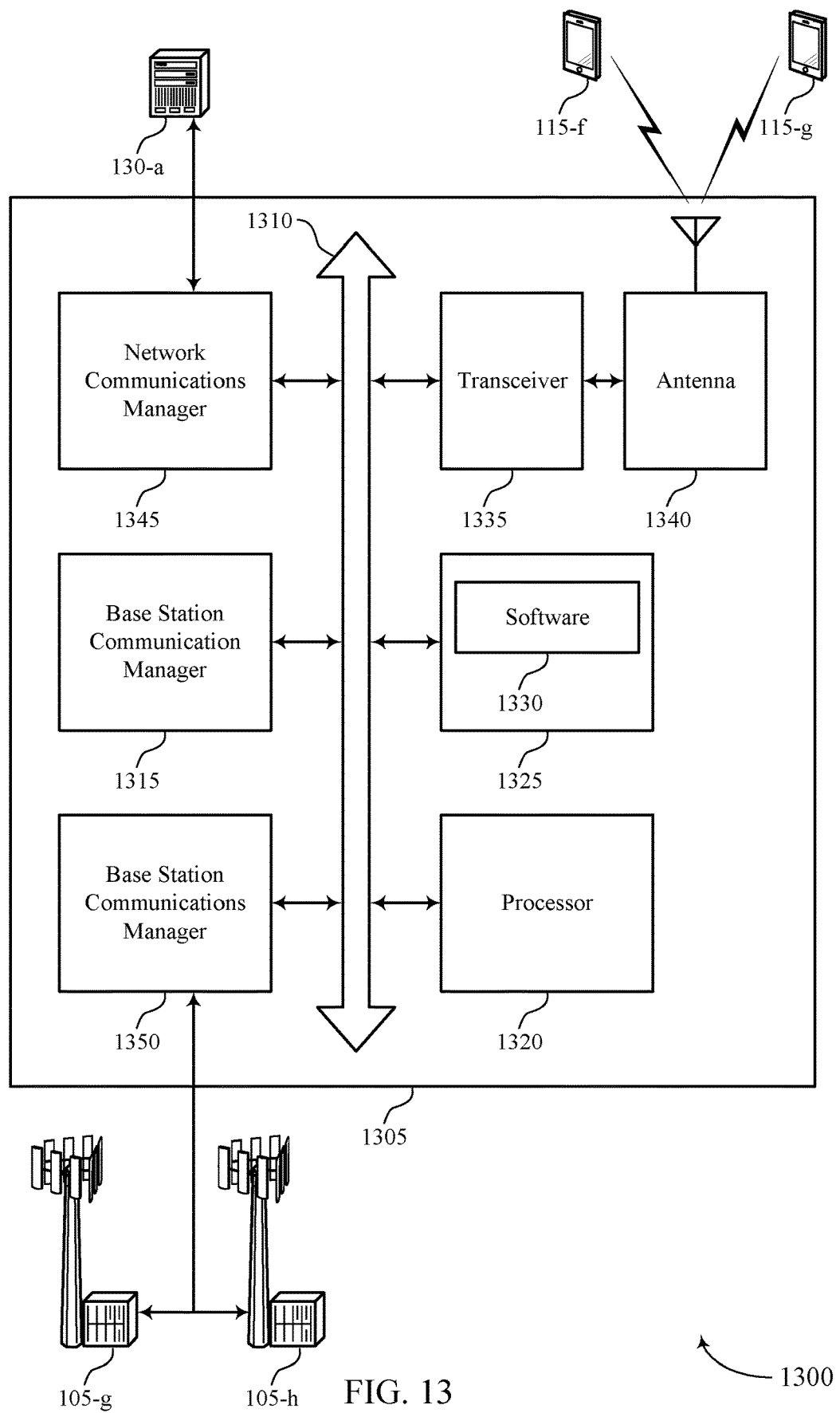
FIG. 13 illustrates a block diagram of a system including a base station that supports license assisted RTS and CTS transmission in accordance with aspects of the present disclosure.

FIG. 13 illustrates a block diagram of a system 1300 including a device 1305 that supports license assisted RTS and CTS transmission in accordance with various aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communication manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting license assisted RTS and CTS transmission).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support license assisted RTS and CTS transmission. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an LTE/LTE-A wireless communication network technology to provide communication between base stations 105.

Figure 14:
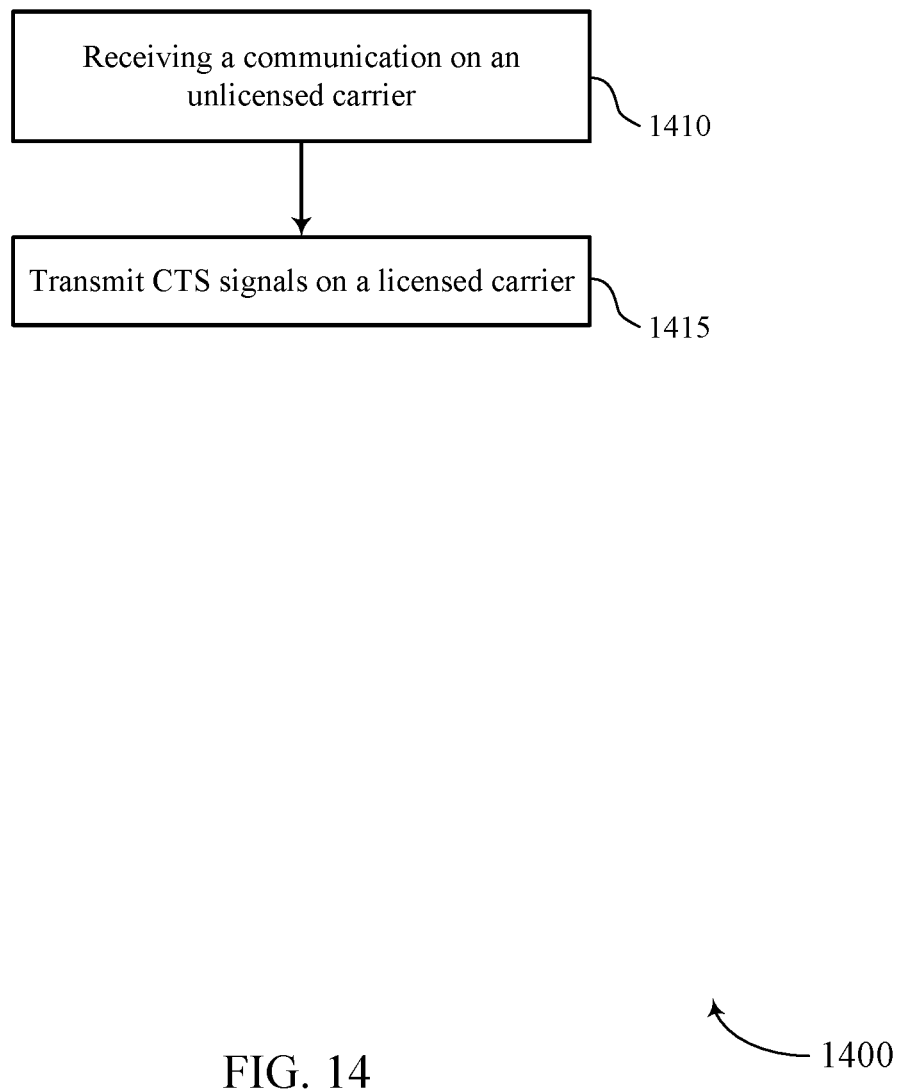
FIGS. 14 through 17 show flowcharts illustrating methods for license assisted RTS and CTS transmission in accordance with aspects of the present disclosure.

FIG. 14 shows a flowchart illustrating a method 1400 for license assisted RTS and CTS transmission in accordance with various aspects of the present disclosure. The operations of method 1400 may be implemented by a UE 115 or its components as described herein. For example, the operations of method 1400 may be performed by a UE communication manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

In some cases, method 1400 may include a configuration of carriers that includes an unlicensed carrier in an unlicensed radio frequency spectrum band and a licensed carrier in a licensed radio frequency spectrum band. The unlicensed carrier and the licensed carrier may each include an uplink and a downlink portion. In some examples, the unlicensed carrier may be configured for TDD while the licensed carrier may be configured for FDD.

At block 1410 the UE 115 may receive a communication on the unlicensed carrier during a downlink portion of a TxOP. The communication on the unlicensed carrier may include data transmissions. The operations of block 1410 may be performed according to the methods as described with reference to FIGS. 1 through 5. In certain examples, aspects of the operations of block 1410 may be performed by a communication component as described with reference to FIGS. 6 through 9.

At block 1415 the UE 115 may transmit one or more CTS signals on the licensed carrier during a time that at least partially overlaps the downlink portion of the TxOP, where the CTS signals are transmitted based on receiving the communication. In some examples, resources on the licensed radio frequency spectrum band may be set aside for transmitting the CTS signals. These resources may be semi-statically reserved. The operations of block 1415 may be performed according to the methods as described with reference to FIGS. 1 through 5. In certain examples, aspects of the operations of block 1415 may be performed by a CTS component as described with reference to FIGS. 6 through 9.

Figure 15:
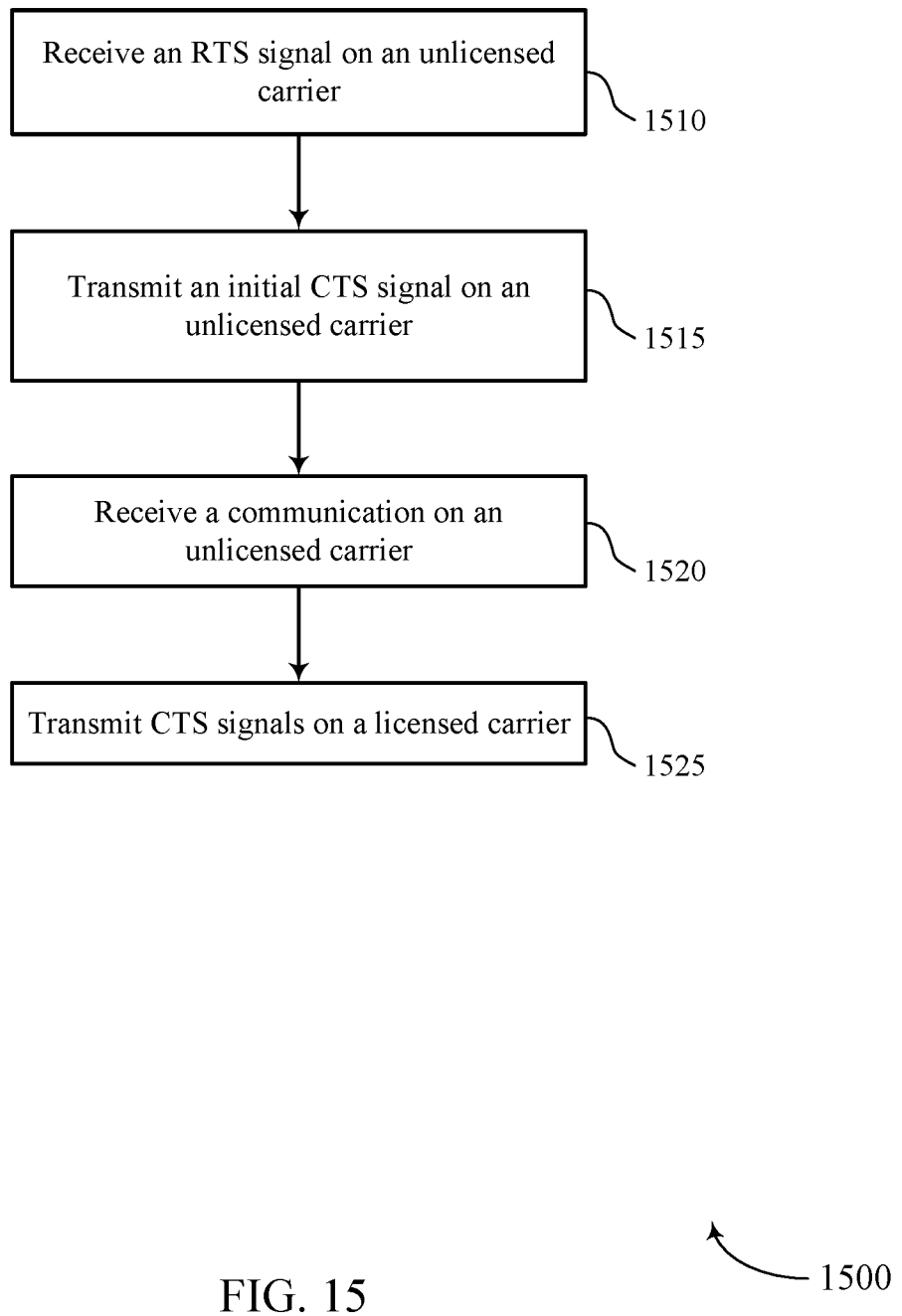

FIG. 15 shows a flowchart illustrating a method 1500 for license assisted RTS and CTS transmission in accordance with various aspects of the present disclosure. The operations of method 1500 may be implemented by a UE 115 or its components as described herein. For example, the operations of method 1500 may be performed by a UE communication manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

In some cases, method 1500 may include a configuration of carriers that includes an unlicensed carrier in an unlicensed radio frequency spectrum band and a licensed carrier in a licensed radio frequency spectrum band. The unlicensed carrier and the licensed carrier may each include an uplink and a downlink portion. In some examples, the unlicensed carrier may be configured for TDD while the licensed carrier may be configured for FDD.

At block 1510 the UE 115 may receive an RTS signal on the unlicensed carrier. The RTS signal may indicate to the UE 115 that a base station 105 has information to transmit to the UE 115. The operations of block 1510 may be performed according to the methods described with reference to FIGS. 1 through 5. In certain examples, aspects of the operations of block 1510 may be performed by an RTS component as described with reference to FIGS. 6 through 9.

At block 1515 the UE 115 may transmit an initial CTS signal in response to the RTS signal, where the received communication is responsive to the initial CTS signal. In some examples, the initial CTS signal may be broadcasted to all surrounding devices within communication range of the UE 115. The initial CTS signal may be transmitted on an unlicensed or a licensed radio frequency spectrum band. The operations of block 1515 may be performed according to the methods described with reference to FIGS. 1 through 5. In certain examples, aspects of the operations of block 1515 may be performed by a CTS component as described with reference to FIGS. 6 through 9.

At block 1520 the UE 115 may receive a communication on the unlicensed carrier during a downlink portion of a TxOP. The communication on the unlicensed carrier may include data transmissions. In some examples, the resources and timing for the received communication may be based on the initial CTS signal. The operations of block 1520 may be performed according to the methods as described with reference to FIGS. 1 through 5. In certain examples, aspects of the operations of block 1520 may be performed by a communication component as described with reference to FIGS. 6 through 9.

At block 1525 the UE 115 may transmit one or more CTS signals on the licensed carrier during a time that at least partially overlaps the downlink portion of the TxOP, where the CTS signals are transmitted based on receiving the communication. In some examples, resources on the licensed radio frequency spectrum band may be set aside for transmitting the CTS signals. These resources may be semi-statically reserved. The operations of block 1525 may be performed according to the methods as described with reference to FIGS. 1 through 5. In certain examples, aspects of the operations of block 1525 may be performed by a CTS component as described with reference to FIGS. 6 through 9.

Figure 16:
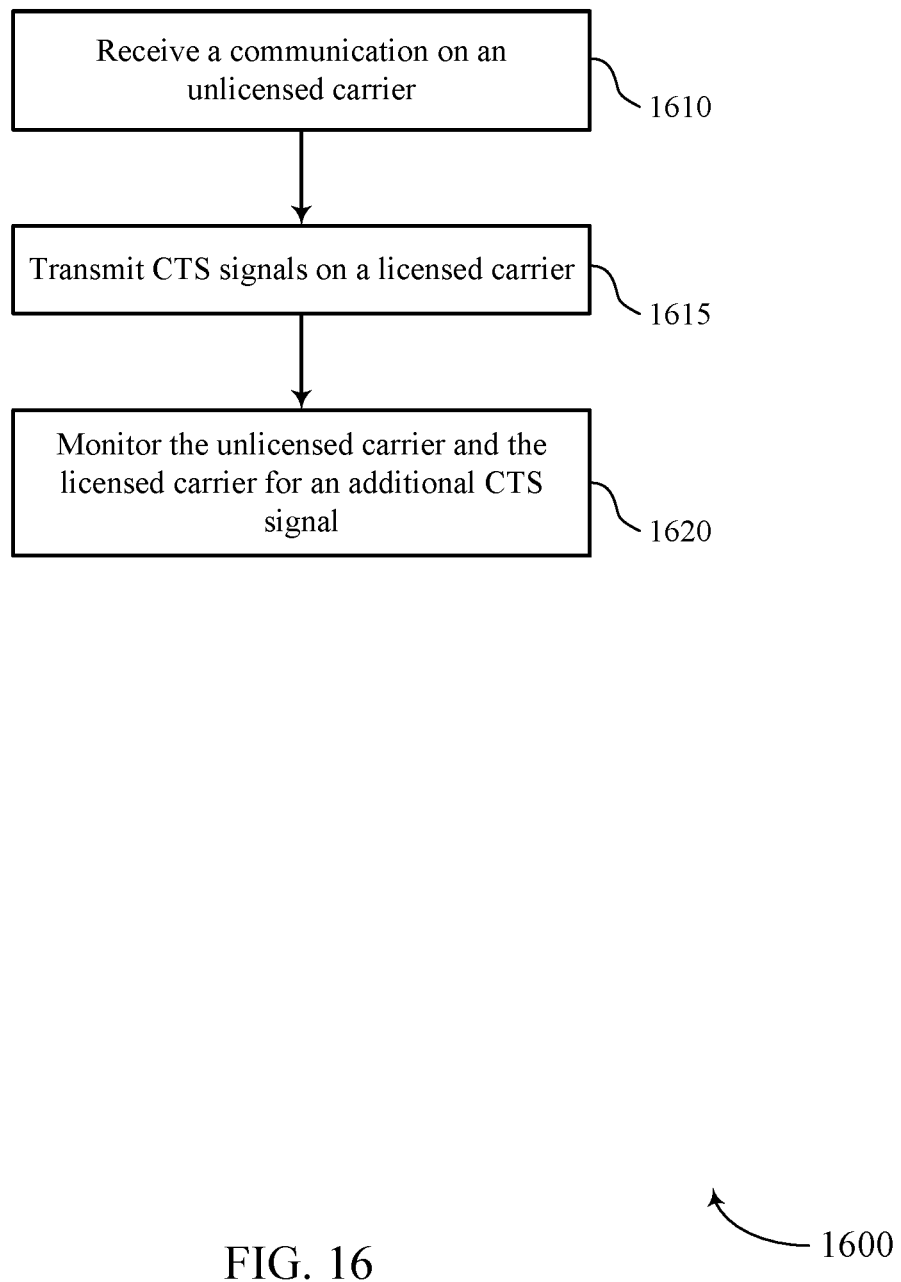

FIG. 16 shows a flowchart illustrating a method 1600 for license assisted RTS and CTS transmission in accordance with various aspects of the present disclosure. The operations of method 1600 may be implemented by a UE 115 or its components as described herein. For example, the operations of method 1600 may be performed by a UE communication manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

In some cases, method 1600 may include a configuration of carriers that includes an unlicensed carrier in an unlicensed radio frequency spectrum band and a licensed carrier in a licensed radio frequency spectrum band. The unlicensed carrier and the licensed carrier may each include an uplink and a downlink portion. In some examples, the unlicensed carrier may be configured for TDD while the licensed carrier may be configured for FDD.

At block 1610 the UE 115 may receive a communication on the unlicensed carrier during a downlink portion of a TxOP. In some examples, the communication on the unlicensed carrier includes data transmissions. The operations of block 1610 may be performed according to the methods as described with reference to FIGS. 1 through 5. In certain examples, aspects of the operations of block 1610 may be performed by a communication component as described with reference to FIGS. 6 through 9.

At block 1615 the UE 115 may transmit one or more CTS signals on the licensed carrier during a time that at least partially overlaps the downlink portion of the TxOP, where the CTS signals are transmitted based on receiving the communication. In some examples, the one or more CTS signals may be broadcasted to all surrounding devices within communication range of the UE 115. The one or more CTS signals may be transmitted on resources on the licensed carrier that are reserved for CTS transmissions. The operations of block 1615 may be performed according to the methods described with reference to FIGS. 1 through 5. In certain examples, aspects of the operations of block 1615 may be performed by a CTS component as described with reference to FIGS. 6 through 9.

At block 1620 the UE 115 may monitor the unlicensed carrier and the licensed carrier for an additional CTS signal from a neighboring device. In some examples, the UE 115 may monitor the unlicensed carrier with a first energy detection threshold and monitor the licensed carrier with a second energy detection threshold that is different than the first energy detection threshold. The operations of block 1620 may be performed according to the methods described with reference to FIGS. 1 through 5. In certain examples, aspects of the operations of block 1620 may be performed by a monitoring component as described with reference to FIGS. 6 through 9.

Figure 17:
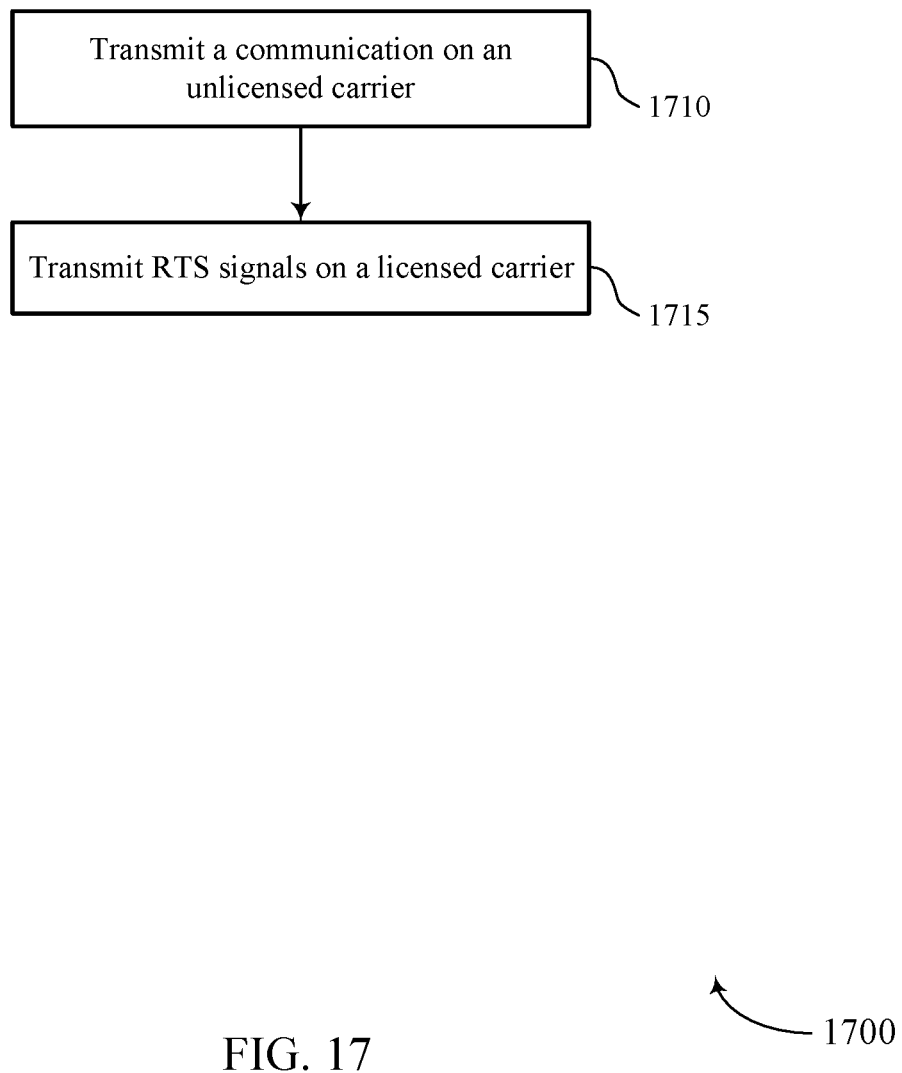

FIG. 17 shows a flowchart illustrating a method 1700 for license assisted RTS and CTS transmission in accordance with various aspects of the present disclosure. The operations of method 1700 may be implemented by a base station 105 or its components as described herein. For example, the operations of method 1700 may be performed by a base station communication manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

In some cases, method 1700 may include a configuration of carriers that includes an unlicensed carrier in an unlicensed radio frequency spectrum band and a licensed carrier in a licensed radio frequency spectrum band. The unlicensed carrier and the licensed carrier may each include an uplink and a downlink portion. In some examples, the unlicensed carrier may be configured for TDD while the licensed carrier may be configured for FDD.

At block 1710 the base station 105 may transmit a communication on the unlicensed carrier during a downlink portion of a TxOP. In some examples, the communication on the unlicensed carrier may include data transmissions. The operations of block 1710 may be performed according to the methods as described with reference to FIGS. 1 through 5. In certain examples, aspects of the operations of block 1710 may be performed by a communication component as described with reference to FIGS. 10 through 13.

At block 1715 the base station 105 may transmit one or more RTS signals on the licensed carrier during a time that at least partially overlaps the downlink portion of the TxOP, where the one or more RTS signals are transmitted based on transmitting the communication. The RTS signals may be transmitted on resources on the licensed carrier that are reserved for RTS transmissions. The operations of block 1715 may be performed according to the methods as described with reference to FIGS. 1 through 5. In certain examples, aspects of the operations of block 1715 may be performed by an RTS component as described with reference to FIGS. 10 through 13.

In some examples, aspects from two or more of the methods may be combined. It should be noted that the methods are just example implementations, and that the operations of the methods may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are new releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 as described with reference to FIGS. 1 and 2—may include one or more carriers, where each carrier may be a signal made up of multiple subcarriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a configuration of carriers that includes an unlicensed carrier in an unlicensed radio frequency spectrum band and a licensed carrier in a licensed radio frequency spectrum band, comprising:
   receiving a communication on the unlicensed carrier during a downlink portion of a transmission opportunity (TxOP);
   determining a channel index of an unlicensed channel of the unlicensed carrier on which the communication is received, wherein the unlicensed carrier comprises a plurality of unlicensed channels each identifiable by a corresponding channel index;
   generating one or more clear-to-send (CTS) signals, each of the one or more CTS signals comprising a payload, the payload comprising an indication of the corresponding channel index of the unlicensed channel on which the communication was received;
   transmitting the one or more CTS signals on the unlicensed carrier that indicate one or more channels for transmissions on the licensed carrier during a time that at least partially overlaps the downlink portion of the TxOP, wherein the one or more CTS signals are transmitted based at least in part on receiving the communication; and
   receiving one or more request-to-send (RTS) signals on the licensed carrier during a time that at least partially overlaps the downlink portion of the TxOP, wherein the one or more RTS signals are received based at least in part on the indication of the corresponding channel index of the unlicensed channel included in the one or more CTS signals.

2. The method of claim 1, further comprising:
   receiving an RTS signal on the unlicensed carrier; and
   transmitting an initial CTS signal on the unlicensed carrier in response to the RTS signal, wherein the received communication is responsive to the initial CTS signal.

3. The method of claim 1, further comprising:
   monitoring the unlicensed carrier and the licensed carrier for an additional CTS signal from a neighboring device.

4. The method of claim 3, wherein the licensed carrier is monitored using a first energy detection threshold and the unlicensed carrier is monitored using a second energy detection threshold different from the first energy detection threshold.

5. The method of claim 1, wherein a duration of the time that at least partially overlaps the downlink portion of the TxOP comprises a duration of the downlink portion of the TxOP.

6. The method of claim 5, wherein the duration of the time that at least partially overlaps the downlink portion of the TxOP comprises a duration of an uplink portion of the TxOP.

7. The method of claim 1, wherein the one or more CTS signals are transmitted with a frequency hopping pattern using a plurality of frequency bands within the licensed carrier.

8. The method of claim 1, wherein a transmission power of the one or more CTS signals is based at least in part on a first path loss parameter that is different from a second path loss parameter of the communication received on the unlicensed carrier.

9. The method of claim 1, further comprising transmitting one or more CTS signals in a frequency region of the licensed carrier associated with the unlicensed channel on which the communication is received.

10. A method for wireless communication in a configuration of carriers that includes an unlicensed carrier in an unlicensed radio frequency spectrum band and a licensed carrier in a licensed radio frequency spectrum band, comprising:
   transmitting a communication on the unlicensed carrier during a downlink portion of a transmission opportunity (TxOP), wherein the unlicensed carrier comprises a plurality of unlicensed channels each identifiable by a corresponding channel index;
   receiving one or more clear-to-send (CTS) signals on the unlicensed carrier that indicate one or more channels for transmissions on the licensed carrier during a time that at least partially overlaps the downlink portion of the TxOP, wherein the one or more CTS signals are received based at least in part on transmitting the communication, and wherein each of the one or more CTS signals comprises a payload, the payload comprising an indication of the corresponding channel index of the unlicensed channel on which the communication was transmitted;
   generating one or more request-to-send (RTS) signals based at least in part on the indication of the corresponding channel index of the unlicensed channel on which the communication is transmitted; and
   transmitting the one or more RTS signals on the licensed carrier during a time that at least partially overlaps the downlink portion of the TxOP, wherein the one or more RTS signals are transmitted based at least in part on transmitting the communication.

11. The method of claim 10, wherein a duration of the time that at least partially overlaps the downlink portion of the TxOP comprises a duration of the downlink portion of the TxOP.

12. The method of claim 11, wherein the duration of the time that at least partially overlaps the downlink portion of the TxOP comprises a duration of an uplink portion of the TxOP.

13. The method of claim 10, wherein the one or more RTS signals are transmitted with a frequency hopping pattern using a plurality of frequency bands of the licensed carrier.

14. The method of claim 10, wherein a transmission power of the one or more RTS signals is based at least in part on a first path loss parameter that is different from a second path loss parameter of the communication transmitted on the licensed carrier.

15. The method of claim 10, further comprising receiving one or more CTS signals in a frequency region of the licensed carrier associated with the unlicensed channel on which the communication is transmitted.

16. The method of claim 10, further comprising:
transmitting an initial RTS signal on the unlicensed carrier; and
receiving a CTS signal on the unlicensed carrier in response to the initial RTS signal, wherein the communication is responsive to the CTS signal.

17. An apparatus for wireless communication in a configuration of carriers that includes an unlicensed carrier in an unlicensed radio frequency spectrum band and a licensed carrier in a licensed radio frequency spectrum band, in a system comprising:
a processor;
memory in electronic communication with the processor; and
instructions stored in the memory and operable, when executed by the processor, to cause the apparatus to:
receive a communication on the unlicensed carrier during a downlink portion of a transmission opportunity (TxOP);
determine a channel index of an unlicensed channel of the unlicensed carrier on which the communication is received, wherein the unlicensed carrier comprises a plurality of unlicensed channels each identifiable by a corresponding channel index;
generate one or more clear-to-send (CTS) signals, each of the one or more CTS signals comprising a payload, the payload comprising an indication of the corresponding channel index of the unlicensed channel on which the communication was received;
transmit the one or more CTS signals on the unlicensed carrier that indicate one or more channels for transmissions on the licensed carrier during a time that at least partially overlaps the downlink portion of the TxOP, wherein the one or more CTS signals are transmitted based at least in part on receiving the communication; and
receive one or more request-to-send (RTS) signals on the licensed carrier during a time that at least partially overlaps the downlink portion of the TxOP, wherein the one or more RTS signals are received based at least in part on the indication of the corresponding channel index of the unlicensed channel included in the one or more CTS signals.

18. The apparatus of claim 17, wherein the instructions are operable to cause the apparatus to:
receive an RTS signal on the unlicensed carrier; and
transmit an initial CTS signal on the unlicensed carrier in response to the RTS signal, wherein the received communication is responsive to the initial CTS signal.

19. The apparatus of claim 17, wherein the instructions are operable to cause the apparatus to:
monitor the unlicensed carrier and the licensed carrier for an additional CTS signal from a neighboring device.

20. The apparatus of claim 19, wherein the instructions are operable to cause the apparatus to:
monitor the licensed carrier using a first energy detection threshold; and
monitor the unlicensed carrier using a second energy detection threshold different from the first energy detection threshold.

21. The apparatus of claim 17, wherein a duration of the time that at least partially overlaps the downlink portion of the TxOP comprises a duration of the downlink portion of the TxOP.

22. The apparatus of claim 17, wherein the instructions are operable to cause the apparatus to:
transmit the one or more CTS signals with a frequency hopping pattern using a plurality of frequency bands within the licensed carrier.

23. The apparatus of claim 17, wherein a transmission power of the one or more CTS signals is based at least in part on a first path loss parameter that is different from a second path loss parameter of the communication received on the unlicensed carrier.

24. The apparatus of claim 17, wherein the instructions are operable to cause the apparatus to:
transmit one or more CTS signals in a frequency region of the licensed carrier associated with the unlicensed channel on which the communication is received.

25. An apparatus for wireless communication in a configuration of carriers that includes an unlicensed carrier in an unlicensed radio frequency spectrum band and a licensed carrier in a licensed radio frequency spectrum band, in a system comprising:
a processor;
memory in electronic communication with the processor; and
instructions stored in the memory and operable, when executed by the processor, to cause the apparatus to:
transmit a communication on the unlicensed carrier during a downlink portion of a transmission opportunity (TxOP), wherein the unlicensed carrier comprises a plurality of unlicensed channels each identifiable by a corresponding channel index;
receive one or more clear-to-send (CTS) signals on the unlicensed carrier that indicate one or more channels for transmissions on the licensed carrier during a time that at least partially overlaps the downlink portion of the TxOP, wherein the one or more CTS signals are received based at least in part on transmitting the communication, and wherein each of the one or more CTS signals comprises a payload, the payload comprising an indication of the corresponding channel index of the unlicensed channel on which the communication was transmitted;
generate one or more request-to-send (RTS) signals based at least in part on the indication of the corresponding channel index of the unlicensed channel on which the communication is transmitted; and
transmit the one or more RTS signals on the licensed carrier during a time that at least partially overlaps the downlink portion of the TxOP, wherein the one or more RTS signals are transmitted based at least in part on transmitting the communication.

26. The apparatus of claim 25, wherein the instructions are operable to cause the apparatus to:
transmit the one or more RTS signals with a frequency hopping pattern using a plurality of frequency bands of the licensed carrier.

27. The apparatus of claim 25, wherein a transmission power of the one or more RTS signals is based at least in part on a first path loss parameter that is different from a second path loss parameter of the communication transmitted on the licensed carrier.

28. The apparatus of claim 25, wherein the instructions are operable to cause the apparatus to:
transmit the one or more RTS signals in a frequency region of the licensed carrier associated with the unlicensed channel on which the communication is transmitted.

* * * * *